Figure 5:
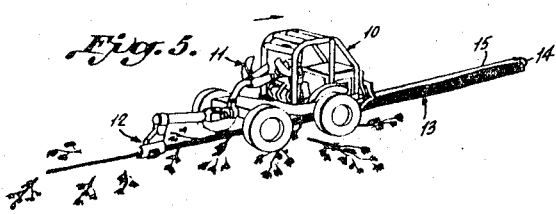

Sept. 12, 1967 C. E. WILLIAMS ET AL 3,340,912
TIMBER HARVESTING AND TRANSPORTING METHOD, SYSTEM
AND APPARATUS
Filed Nov. 6, 1963 18 Sheets-Sheet 1
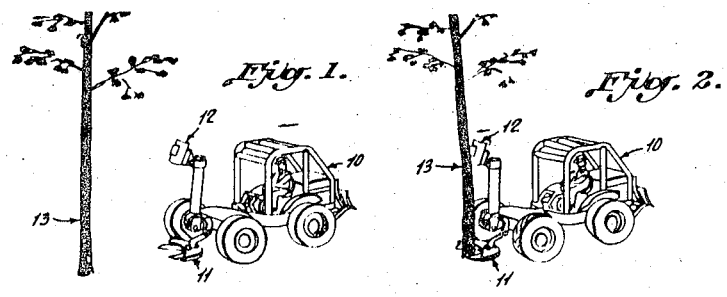
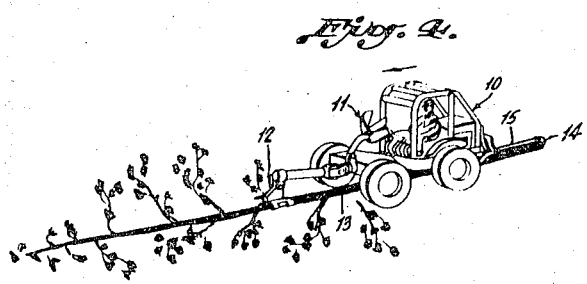

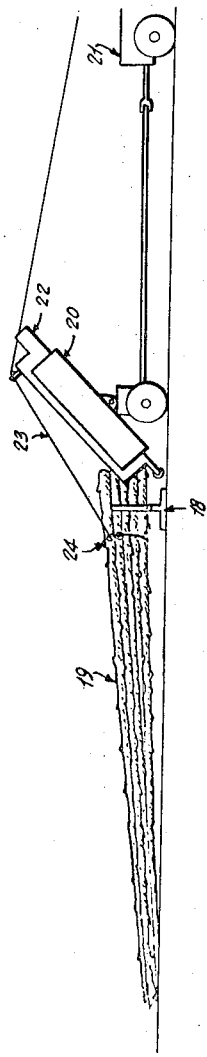
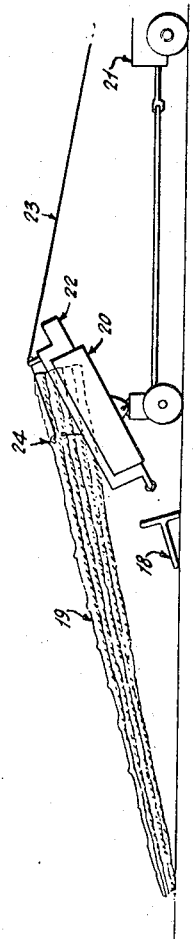

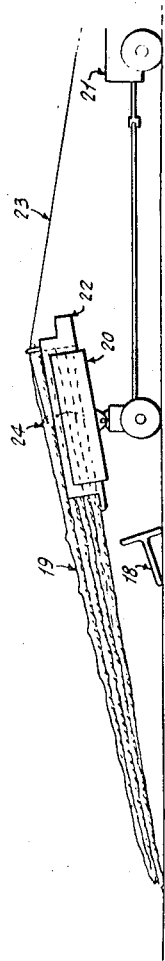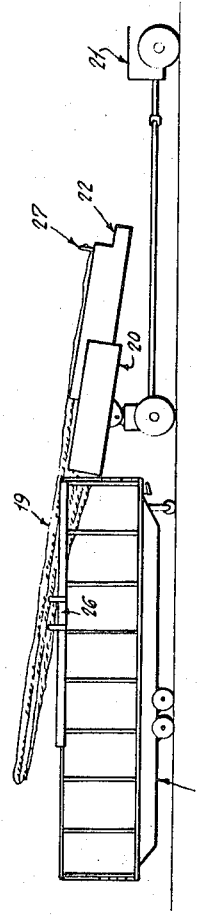

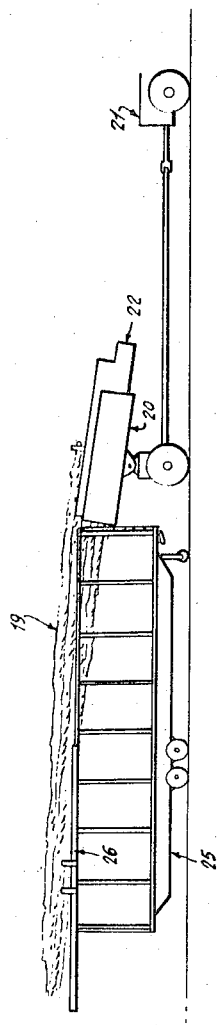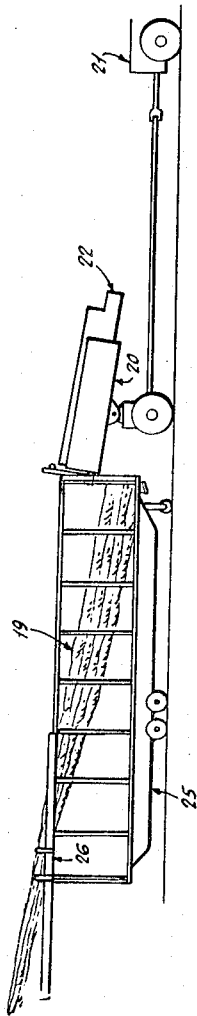

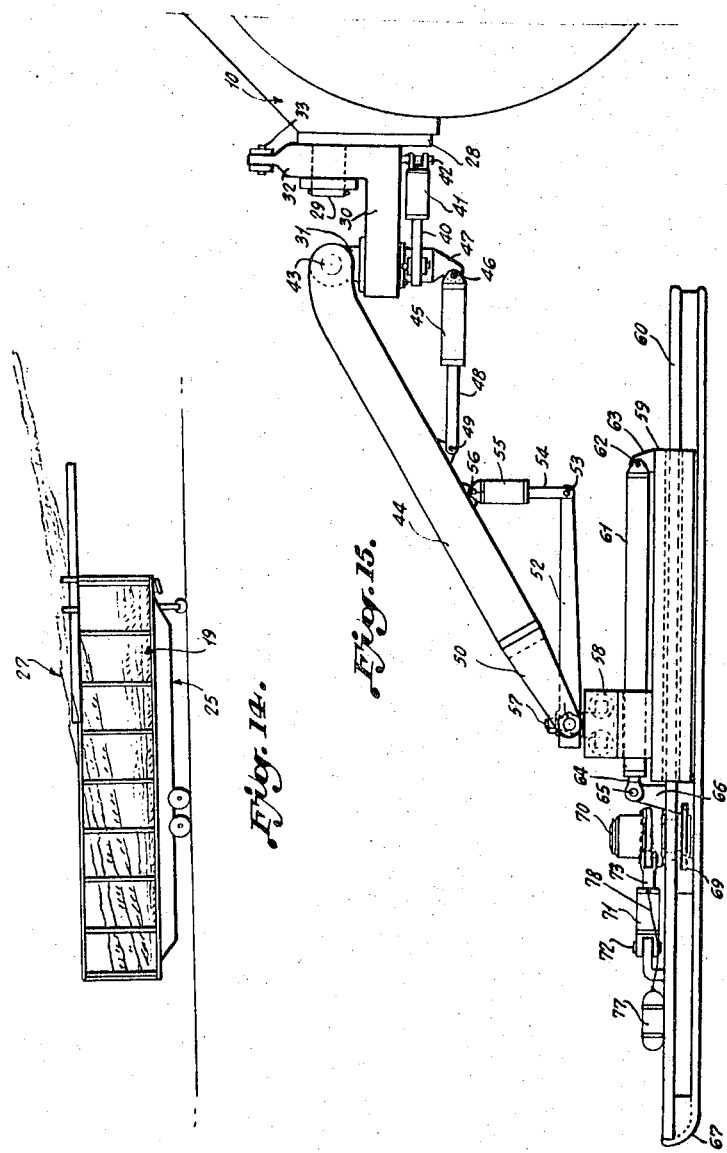

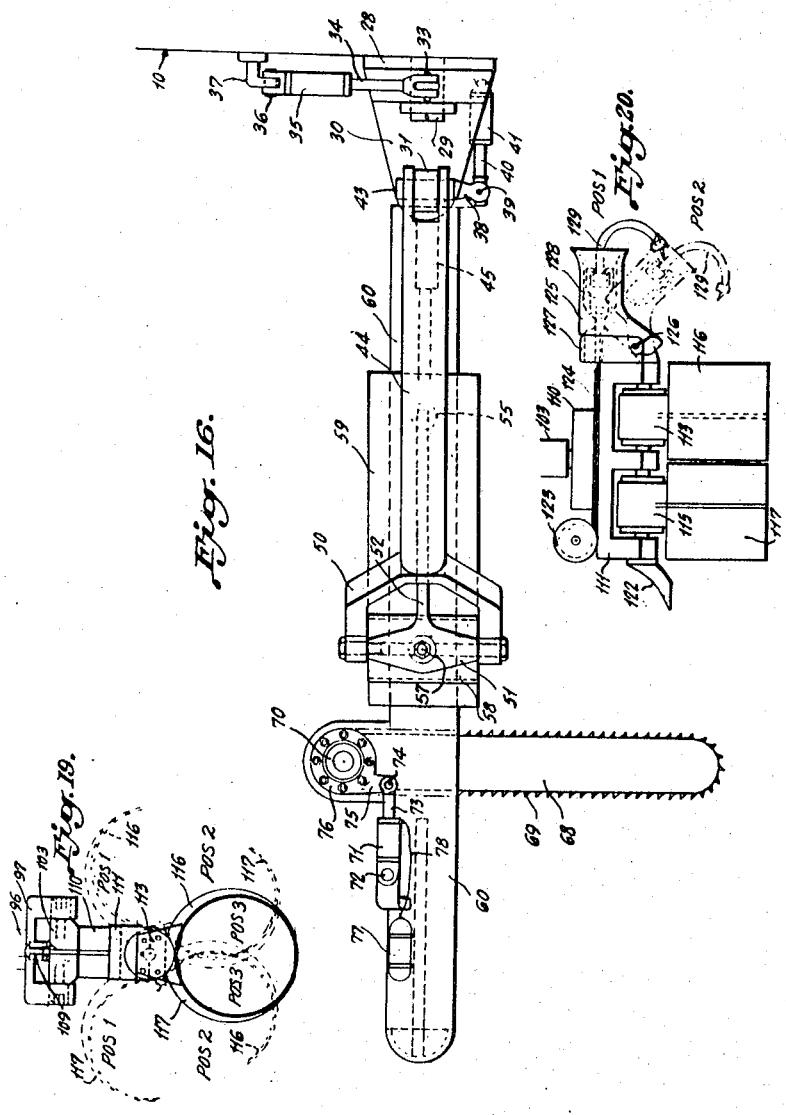

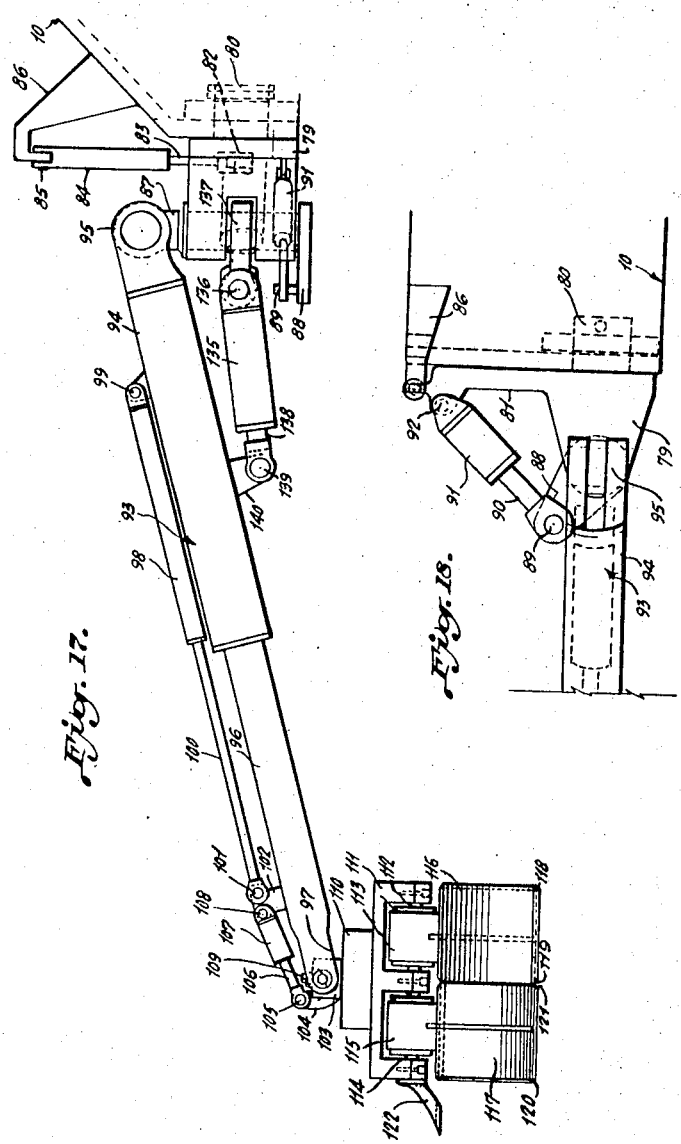

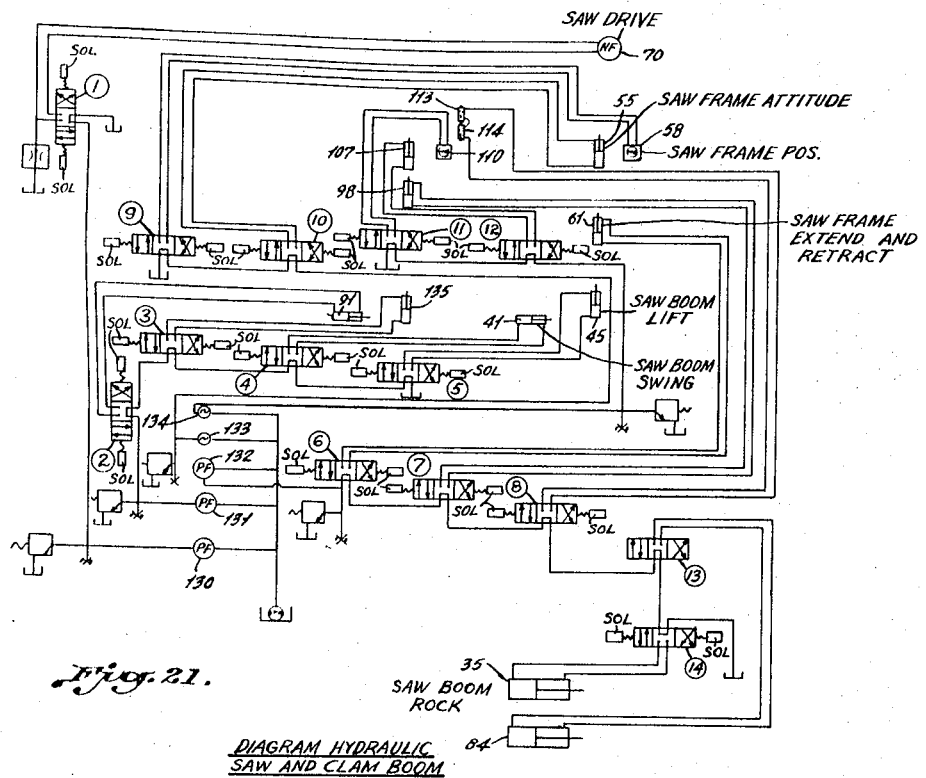

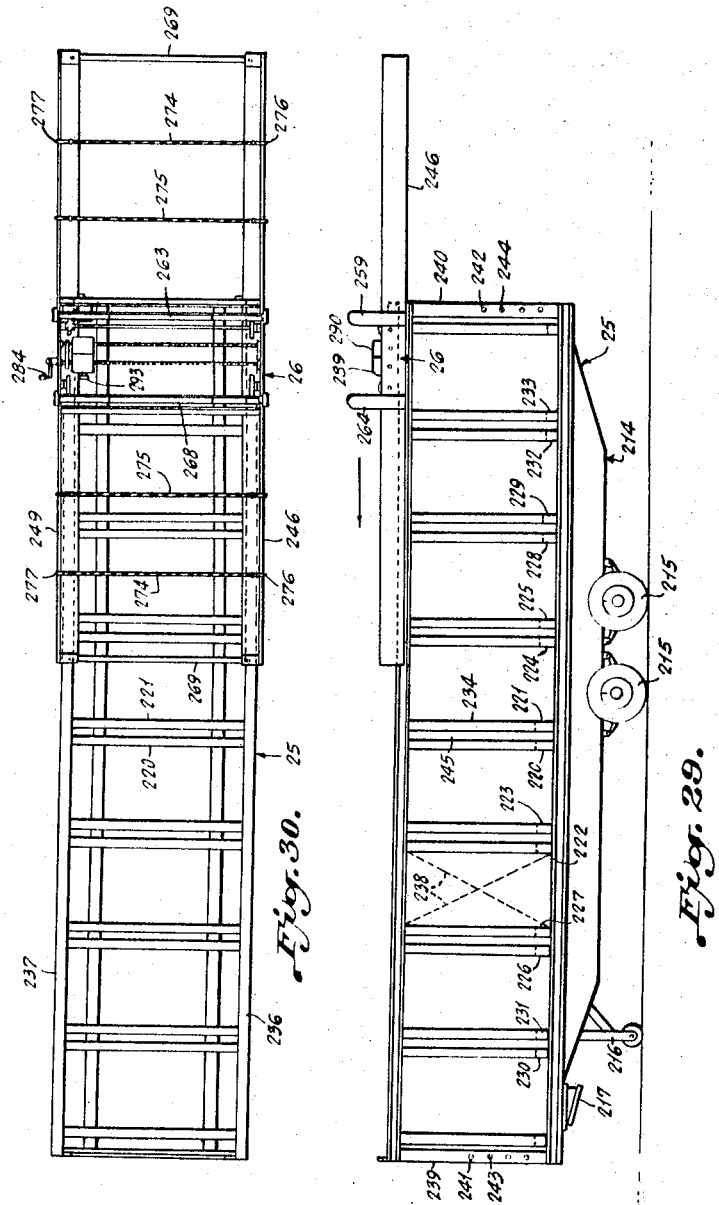

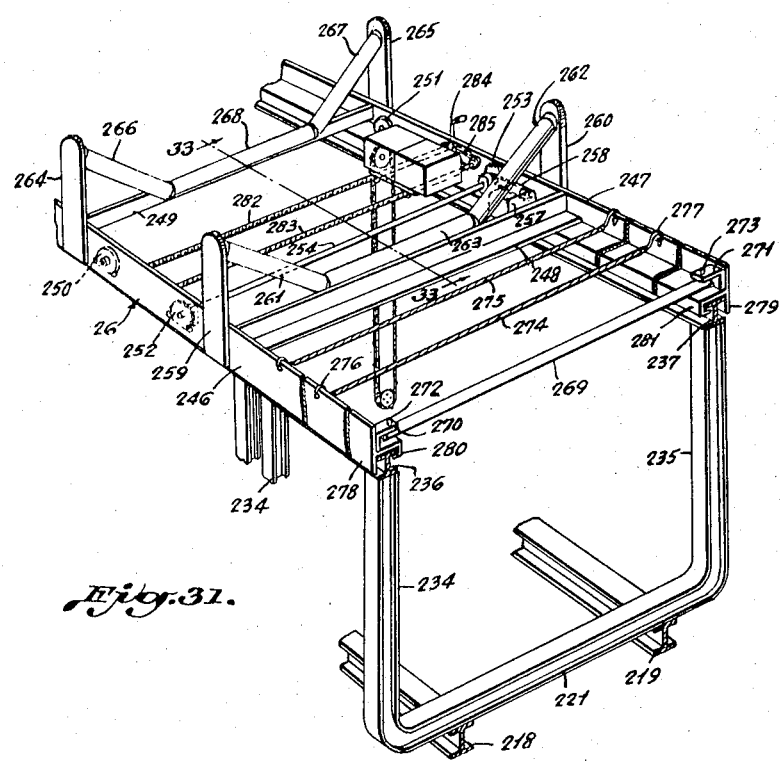

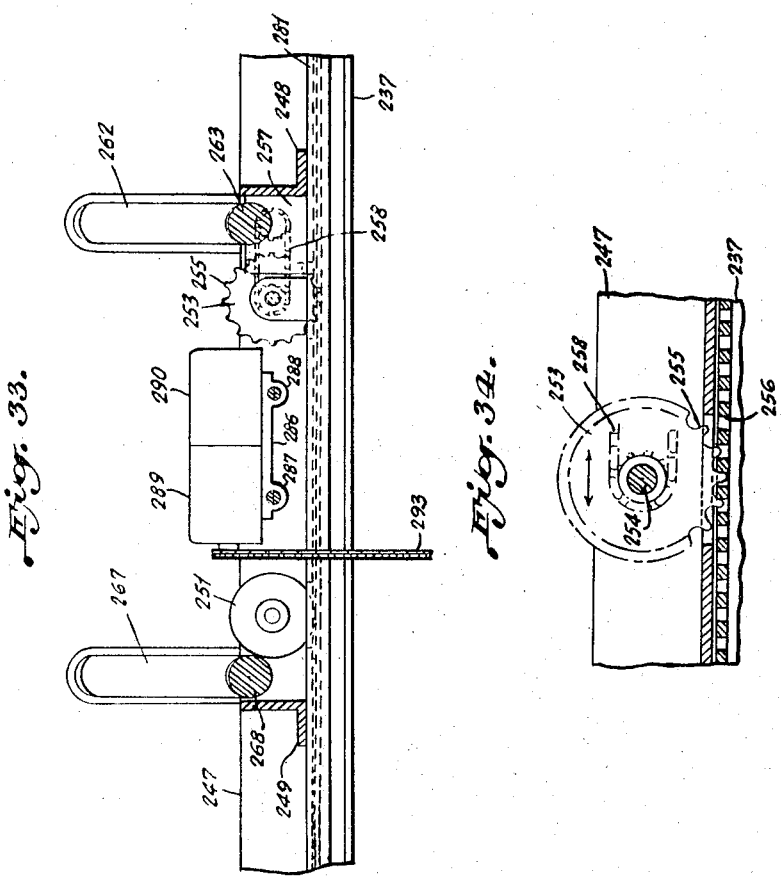

United States Patent Office
3,340,912
Patented Sept. 12, 1967

3,340,912
TIMBER HARVESTING AND TRANSPORTING METHOD, SYSTEM AND APPARATUS
Charles E. Williams, Savannah, Ga., and Frederick L. Dillingham, Munford, Ala., assignors to Continental Can Company, Inc., New York, N.Y.
Filed Nov. 6, 1963, Ser. No. 321,836
25 Claims. (Cl. 144—3)

This invention relates to the harvesting and transportation of forest products and more particularly to a timber harvesting and transporting method, system and apparatus primarily intended for use in the production of pulp wood, but also usable with great advantage in the production of saw logs and other forest products.

It is well known in the pulp wood industry that for many years the production of pulp wood has been carried on in a grossly inefficient manner and, in fact, with the exception of the introduction of lightweight chain saws and the widely scattered use of some mechanized equipment, there has been little change in the method of producing pulp wood or the apparatus used therefor within the past twenty-five years. It appears that in all probability, the main reason why such an inefficient operation has been permitted to continue over this period of time is the fact that an ample supply of low-cost labor has been available and apparently very little consideration was given to whether or not a mechanized system of pulp wood production could be devised which would result in a material saving in production cost, regardless of the availability of low cost labor. As result, the time honored methods and apparatus utilized in the production of pulp wood have prevailed up to the present time and it would appear that the losses in production costs occasioned thereby when compared to the results possible with a suitable mechanized system have amounted to millions of dollars.

The present system of pulp wood production which provides approximately 0.22 cord per man hour, involves the use of one man equipped with a chain saw for felling trees and since no particular effort is made to fell such trees in any particular direction, the logs resulting therefrom are left lying in all directions in the manner of jackstraws and this materially impedes subsequent recovery of such logs. One to four men equipped with chain saws and axes are required to delimb and top trees which have been felled by one man and thus, two to five men are required in order to fell, top and delimb trees in order to maintain the extremely low production level mentioned above.

The logs are next transported to a loading station and for this operation a skidding tractor is normally utilized in the operation of which it is necessary to choke each log to the tractor drawbar or to a winch line leading from the tractor, after which the log is skidded to the loading station. A great deal of time is utilized in choking the log to connect the same to the tractor and unchoking the same therefrom and if the tractor operator performs this function, the tractor sets idle for an appreciable proportion of the time, while if an additional man is utilized for this function, additional labor cost results. Furthermore, since directional felling of trees is not commonly utilized at present, there is a considerable loss of time in extracting logs from jackstrawed piles or logs which are entangled in other trees which further contributes to the inefficiency of the present system.

At the loading station the logs are cut into predetermined lengths, usually approximately five feet in the pulp wood industry and such length are hand-loaded onto a highway truck or trailer. In some instances, however, the cut lengths may be hand-loaded into pallets which are thereafter loaded by means of a crane, fork truck or other suitable apparatus onto the highway truck for transportation to a desired location. Hand-loading is extremely hard and slow work and the use of pre-loaded pallets which also must be hand-loaded requires the use of relatively costly equipment.

Some attempts have been made to improve the above described system by the use of crane operated slings, fork trucks, grapples and the like and such expedients involve the use of relatively costly equipment without materially contributing to the efficiency of the operation.

In view of the above, it appears that any material reduction in the cost of pulp wood production must come from the provision of a completely new system for producing pulp wood, rather than in any improvements within the framework of the presently used system and the present invention is intended to provide such a new system which will permit the production of pulp wood at the rate of at least two cords per man hour which obviously, represents a radical improvement over the presently used system and with a consequent radical reduction in production costs.

The system of the present invention contemplates the provision of a unitary apparatus for directionally felling trees, delimbing and topping the same on the ground to provide logs and for transporting and depositing such logs on a cradle to form a bunch of logs of the desired size. There is further provided a self-loading and unloading pre-haul vehicle which loads the entire bunch of logs longitudinally from the cradle and transports the same to a loading station. At the loading station, a final haul road vehicle, usually in the form of a trailer, is positioned and the pre-haul vehicle may be positioned in longitudinal alignment with the road vehicle and the bunch of logs ejected as a unit longitudinally from the pre-haul vehicle onto the road vehicle. A bucking saw apparatus may be provided on the road vehicle for cutting the bunch of logs thereon into predetermined lengths or if desired, a separate bucking saw apparatus may be utilized for accomplishing this purpose. After complete loading of the road vehicle, the same may be hauled to any desired location while a subsequent road vehicle is being loaded, thereby materially reducing the idle time of the tractor utilized for hauling the road vehicle.

The above briefly described system of this invention requires the use of a single operator for feeling, delimbing and topping trees and for transporting and depositing the logs on the cradle, a single operator for operating the pre-haul vehicle, a driver for the tractor for the road vehicle and either the driver of such tractor or another person may operate the bucking saw apparatus for cutting the logs into predetermined lengths on the road vehicle. Thus, a minimum number of persons are necessary to carry out the system of this invention and even though such persons must be more highly skilled and, therefore, paid higher wages than the presently used relatively unskilled labor, nevertheless, the relatively few persons necessary for operation of the system of this invention results in a reduced labor cost and even though there will be an appreciable investment for equipment for carrying out the present system, nevertheless, the very material increase in production coupled with the reduction in labor costs results in a material saving in the production of pulp wood.

It is accordingly an object of the invention to provide an improved method of harvesting and transporting timber which results in materially reducing the cost of production.

A further object of the invention is the provision of an improved method of harvesting and transporting timber, which method operates to reduce the use of manual labor to a minimum.

A still further object of the invention is the provision of an improved method of harvesting and transporting timber which includes directionally felling a tree, delimbing and topping the tree while on the ground to provide a log, transporting and depositing the log on a cradle to form a bunch of logs of the desired size, loading a bunch of logs as a unit onto a self-loading pre-haul vehicle and transporting the same to a loading point for a final haul road vehicle, loading the logs as a unit longitudinally from the pre-haul vehicle directly onto the final haul vehicle and cutting the logs into desired lengths on the final haul road vehicle.

Another object of the invention is the provision of a system for harvesting and transporting timber involving the use of mechanized equipment whereby the use of manual labor is reduced to a minimum and resulting in materially reducing the cost of production of such timber.

A further object of the invention is the provision of a system for harvesting and transporting timber which includes the provision and use of a unitary directional tree felling, delimbing, topping and log moving apparatus, a pre-haul self-loading and unloading vehicle, a final haul road vehicle and bucking saw apparatus mounted on the road vehicle for cutting logs thereon into desired lengths.

A still further object of the invention is the provision of a system for harvesting and transporting timber which includes the provision and use of a unitary directional tree felling, delimbing, topping and log moving apparatus, a self-loading and unloading pre-haul vehicle, a final haul road vehicle and bucking saw apparatus for cutting the logs on the final haul road vehicle into predetermined lengths.

Another object of the invention is the provision of a unitary directional tree felling, delimbing, topping and log moving apparatus which may be operated by a single operator.

A further object of the invention is the provision of a unitary directional tree felling, delimbing, topping and log moving apparatus which may be operated by a single operator to directionally fell a tree, delimb and top the tree while laying on the ground to provide a log, grip and move the log and deposit the same on a cradle to provide a bunch of logs of the desired size.

A still further object of the invention is the provision of a unitary directional tree felling, delimbing, topping and log moving apparatus, including a self-propelled vehicle, means on such vehicle for felling a tree in a desired direction, further means on the vehicle for delimbing and topping a tree and including a winch and cable arrangement having a dog attached thereto which may engage the log to move the same relative to the delimbing means and which is thereafter automatically disengageable from the log, the delimbing means being further operable to grip and raise the butt end of the log to permit movement thereof and depositing of the same on a cradle to form a bunch of logs of the desired size.

Another object of the invention is the provision of a unitary directional tree felling, delimbing, topping and log moving apparatus, including a self-propelled vehicle with such apparatus mounted thereon and in which the delimbing means operates to strip or remove the limbs from a tree on the ground, further operates to sever the top of the tree and further operates to grip the tree or log to permit lifting and transporting of the same by movement of the vehicle.

A further object of the invention is the provision of a unitary directional tree felling, delimbing, topping and log moving apparatus, including a self-propelled vehicle and a chain saw mounted on the vehicle for felling a tree, such saw being movable to an operative position and movable to an inoperative position.

A still further object of the invention is the provision of an end self-loading and unloading pre-haul vehicle which may be utilized to load a bunch of logs longitudinally onto the vehicle, transport the same to a desired location and unload the same onto a final haul road vehicle, such pre-haul vehicle being operable by a single operator.

Another object of the invention is the provision of an end self-loading and unloading pre-haul vehicle which may be utilized to load a bunch of logs longitudinally onto such vehicle, the load supporting body of the vehicle being mounted for tilting movement about a horizontal axis, such tilting being accomplished by movement of the body and load longitudinally to shift the center of gravity thereof to tilt the body in either direction.

A further object of the invention is the provision of an end self-loading and unloading pre-haul vehicle which may be utilized to load a bunch of logs longitudinally onto such vehicle there being pusher means provided in the vehicle and power means for operating such pusher means to eject a bunch of logs as a unit longitudinally of the vehicle.

A still further object of the invention is the provision of an end self-loading and unloading pre-haul vehicle which may be utilized for loading a bunch of logs longitudinally onto the vehicle and including pusher means for ejecting the logs as a unit from the pre-haul vehicle directly onto a final haul road vehicle, the pre-haul vehicle being also provided with releasable coupling means for coupling the same to the final haul road vehicle during loading thereof to prevent separation of the pre-haul vehicle from the final road vehicle.

Another object of the invention is the provision of a final haul road vehicle for receiving a bunch of logs directly from a pre-haul vehicle, there being a bucking saw apparatus provided on the road vehicle for cutting logs thereon into desired lengths.

A further object of the invention is the provision of a final haul road vehicle for receiving a bunch of logs longitudinally directly from a pre-haul vehicle, there being a bucking saw apparatus provided on the road vehicle for cutting logs thereon into desired lengths, the bucking saw apparatus including log supporting means for supporting the bunch of logs during transfer from the pre-haul vehicle to the road vehicle.

A still further object of the invention is the provision of a final haul road vehicle for receiving a bunch of logs longitudinally directly from a pre-haul vehicle, there being a bucking saw apparatus mounted for longitudinal movement on the road vehicle to cut logs thereon into desired lengths, the road vehicle also including means to indicate the location of the cuts for the logs.

Another object of the invention is the provision of a final haul road vehicle for receiving a bunch of logs longitudinally directly from a pre-haul vehicle, there being a bucking saw apparatus mounted on the road vehicle and including power means for moving the bucking saw apparatus longitudinally of the road vehicle to cut logs thereon into desired lengths.

A further object of the invention is the provision of a final haul road vehicle for receiving logs longitudinally directly from a pre-haul vehicle, there being a bucking saw apparatus provided on the road vehicle and including a chain saw movable to a position for cutting logs disposed in the vehicle to desired lengths, such saw being movable to a position to cut the top portions of logs projecting above the side structure of the vehicle.

A still further object of the invention is the provision of a final haul road vehicle for receiving a bunch of logs longitudinally directly from a pre-haul vehicle, the road vehicle including log supporting bunks thereon and the height of such bunks decreasing from the center of the vehicle toward each end.

A still further object of the invention is the provision of a final haul road vehicle for receiving a bunch of logs longitudinally directly from a pre-haul vehicle, such road vehicle including means for facilitating the cutting of logs thereon into desired lengths.

Another object of the invention is the provision of a bucking saw apparatus, including a carriage, means to move the carriage longitudinally of logs to be cut into desired lengths, a saw mounted for transverse movement on the carriage, such saw also being mounted for swinging movement in a vertical plane to permit the cutting of logs disposed below the carriage and also the cutting of logs disposed above the carriage.

Figure 6:
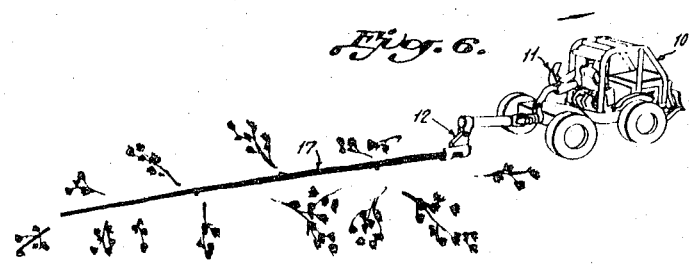
Figure 7:
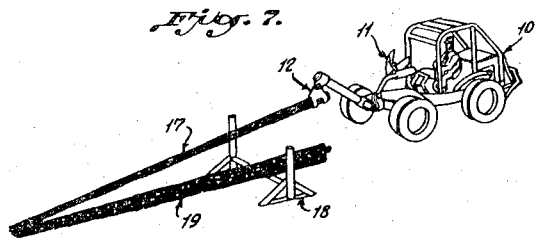
Figure 22:
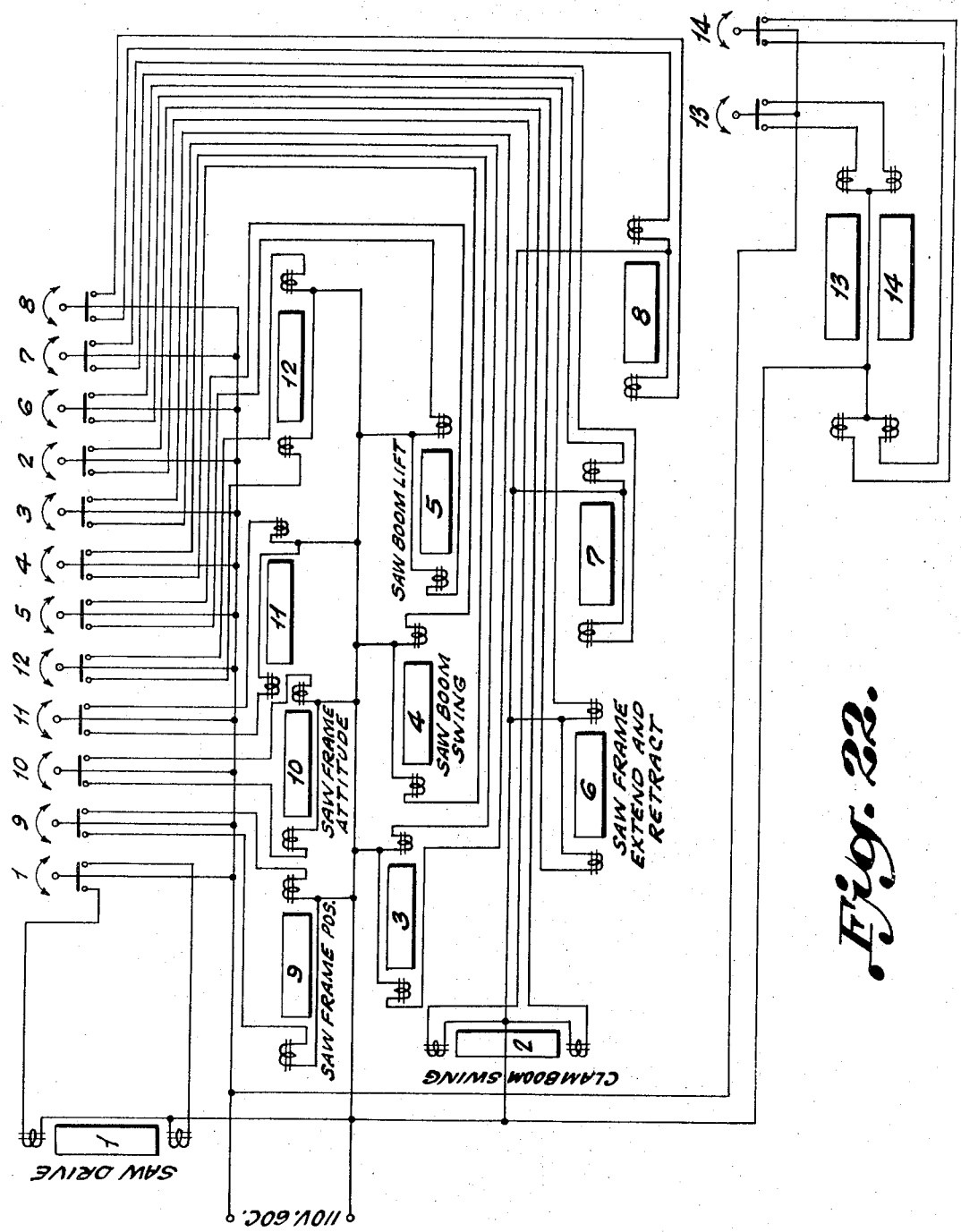
Figure 23:
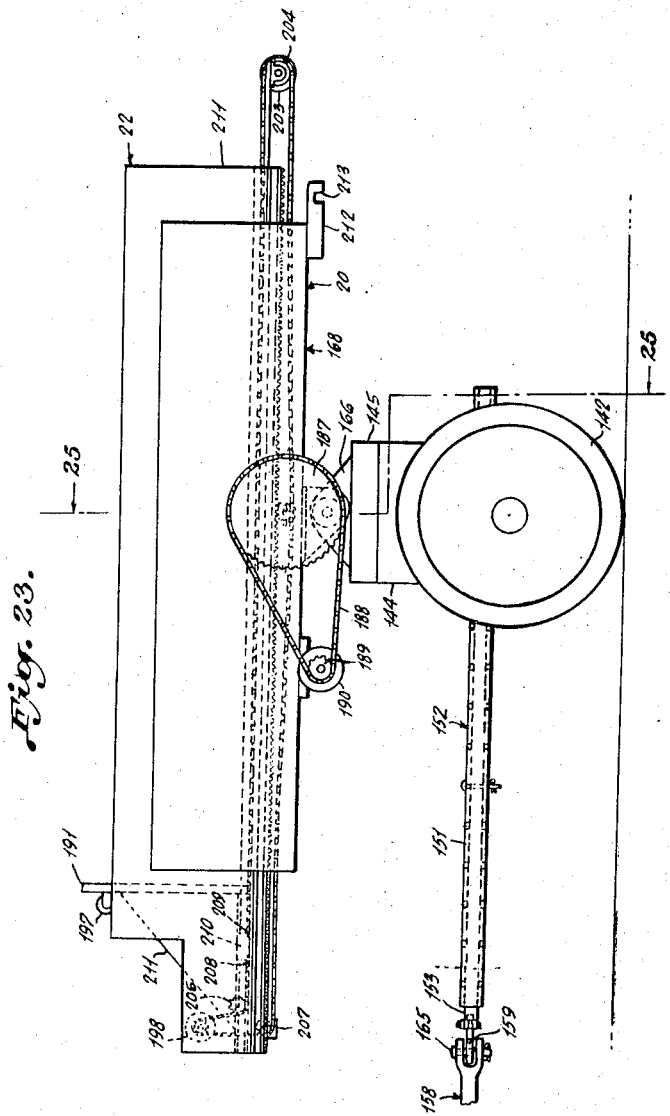
Figure 24:
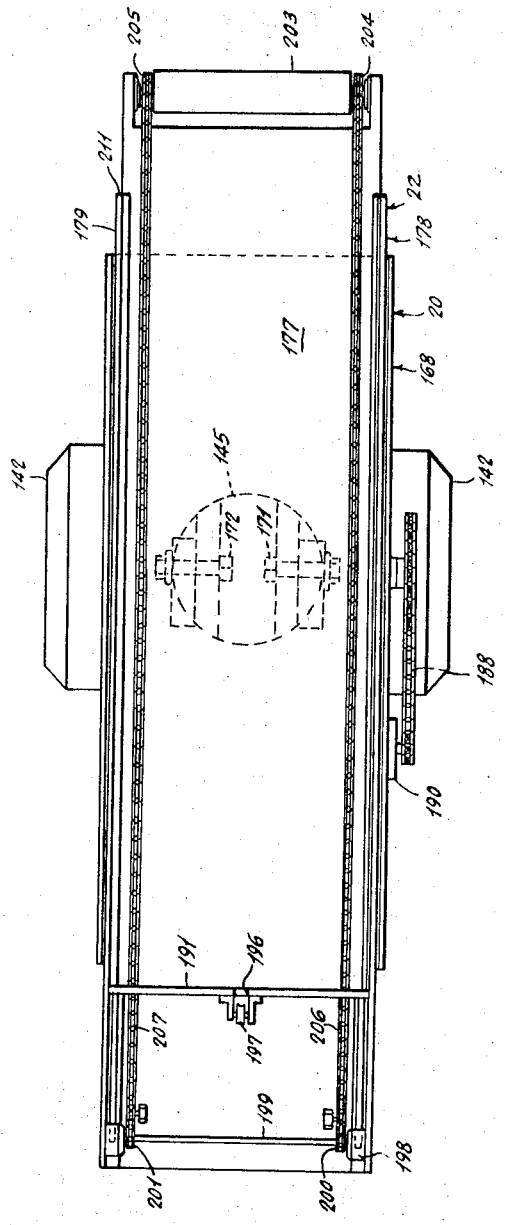
Figure 25:
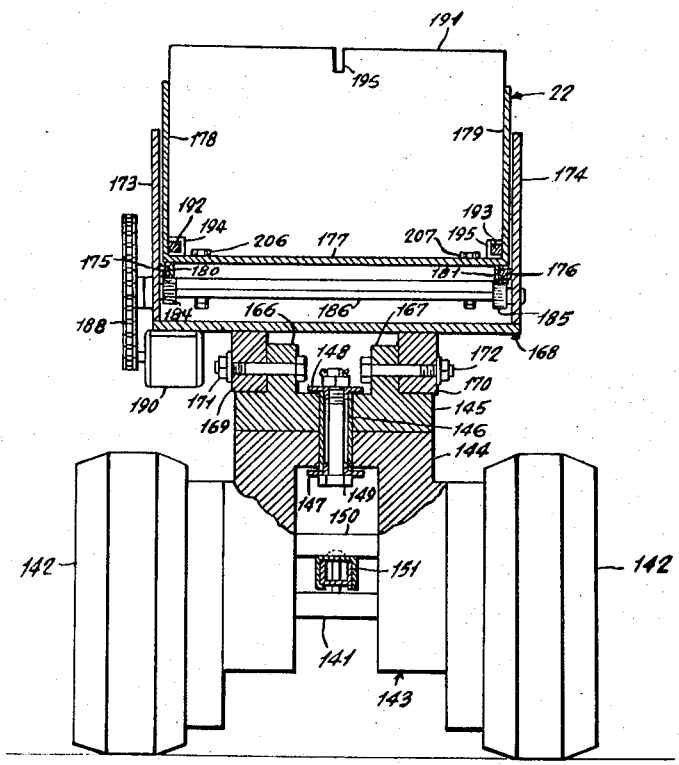
Figure 26:
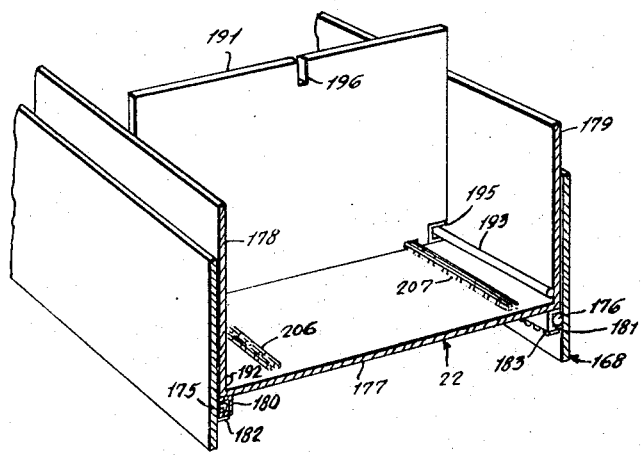
Figure 27:
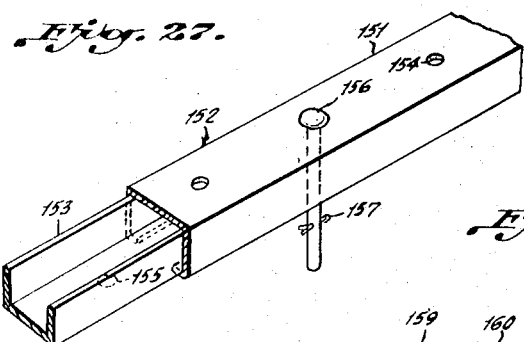
Figure 28:
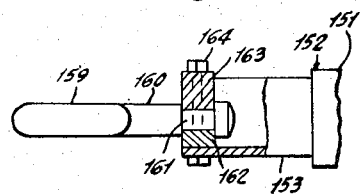
Figure 32:
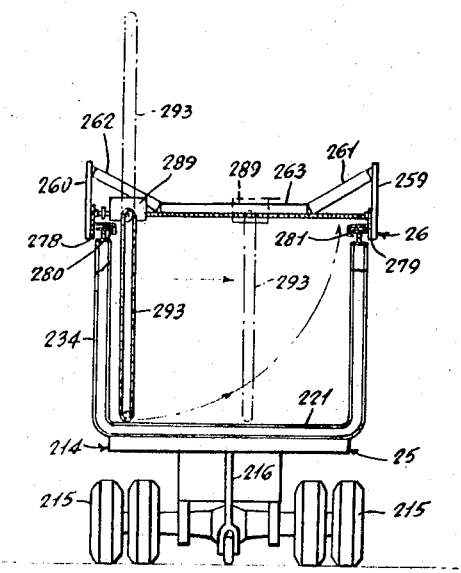
Figure 35:
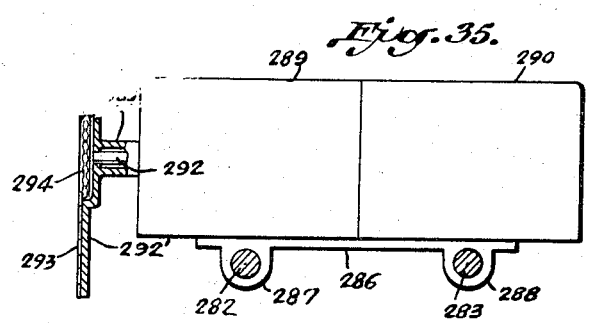

Further objects and advantages of the invention will be apparent from the following description taken in conjunction with the accompanying drawings wherein:

FIG. 1 is a diagrammatic view in perspective showing the tree felling, delimbing, topping and log moving apparatus approaching a tree to be cut;

FIG. 2 a view similar to FIG. 1 and showing cutting means in the form of a shear engaging the tree to cut the same and a pusher means engaging the tree to ensure felling of the same in the desired direction;

FIG. 3 a diagrammatic view in perspective showing the tree felling, delimbing, topping and log moving apparatus approaching a felled tree to commence the delimbing operation;

FIG. 4 a view similar to FIG. 3 and showing a winch operated dog engaging the butt end of the tree and showing the manner in which the limbs on the upper portion of the tree are removed;

FIG. 5 a view similar to FIG. 4 and showing completion of the topping operation, as well as the removal of the remainder of the limbs on the tree;

FIG. 6 a view similar to FIG. 5, but showing the manner in which the log is gripped for moving the same;

FIG. 7 a view similar to FIG. 6, but showing the manner in which the log is deposited on a cradle to form a bunch of logs of the desired size;

FIG. 8 a side elevational view showing the first step in loading the pre-haul vehicle of this invention with a bunch of logs previously positioned on a cradle;

FIG. 9 a side elevational view similar to FIG. 8 and showing the bunch of logs in position on the pre-haul vehicle with the body of the vehicle partially tilted toward load-carrying position;

FIG. 10 a side elevational view similar to FIG. 9 but showing the logs fully loaded and the body of the pre-haul vehicle in position for transporting the logs;

FIG. 11 a side elevational view showing the pre-haul vehicle aligned with the final haul road vehicle and with the top ends of the logs raised and in position for transfer from the pre-haul vehicle to the road vehicle;

FIG. 12 a side elevational view similar to FIG. 11 but showing the logs partially transferred from the pre-haul vehicle to the road vehicle;

FIG. 13 a side elevational view showing the logs in position on the road vehicle and prior to bucking of the same into predetermined lengths;

FIG. 14 a side elevational view showing a previously loaded bunch of logs on the road vehicle and a second bunch of logs loaded thereon prior to bucking the same into predetermined lengths;

FIG. 15 a fragmentary side elevational view showing the forward end of a self-propelled vehicle and the mounting thereon for a tree felling saw;

FIG. 16 a top plan view showing the arrangement of the tree felling saw on the self-propelled vehicle;

FIG. 17 a fragmentary side elevational view showing the mounting of the combined tree pusher, delimber, topper and gripper on a self-propelled vehicle;

FIG. 18 a fragmentary top plan view showing the mounting for the tree pusher, delimber, topper and gripper and particularly the means for swinging the boom about a vertical axis;

FIG. 19 a diagrammatic elevational view showing in full lines the position of the gripper jaws for the final delimbing operation and for gripping the log and showing in dotted lines the position of the jaws for delimbing the upper portion of a tree and in a second position for severing the top of the tree;

FIG. 20 a fragmentary side elevational view showing the mounting for a winch and cable arrangement, together with a log engaging dog and a pivotally mounted funnel member for receiving the dog when in inoperative position;

FIG. 21 a schematic diagram showing the hydraulic circuit for controlling and operating the tree felling saw, as well as the tree pusher, delimber, topper and gripper means;

FIG. 22 a schematic diagram showing the electrical circut for controlling the operation of the hydraulic circuit shown in FIG. 21;

FIG. 23 a side elevational view showing the pre-haul vehicle of this invention;

FIG. 24 a top plan view of the pre-haul vehicle shown in FIG. 23;

FIG. 25 a sectional view with parts in elevation and taken substantially on the line 25—25 of FIG. 23;

FIG. 26 a fragmentary view in perspective showing the chassis of the pre-haul vehicle of this invention, the mounting of the load-carrying body thereon, together with the mounting of the pusher plate in the load-carrying body and further showing the rack for moving the load-carrying body with respect to the chassis and the chains for moving the pusher plate with respect to the load-carrying body;

FIG. 27 a fragmentary view in perspective showing the telescoping adjustable drawbar for the pre-haul vehicle of this invention;

FIG. 28 a side elevational view with parts in section and showing the swivel mounting for the coupling of the drawbar to permit rocking of the pre-haul vehicle with respect to the towing vehicle;

FIG. 29 a side elevational view showing the final haul road vehicle of this invention, together with a bucking saw apparatus mounted thereon for longitudinal movement;

FIG. 30 a top plan view of the final haul road vehicle shown in FIG. 29;

FIG. 31 a fragmentary view in perspective showing details of the bucking saw apparatus mounted on the final haul road vehicle;

FIG. 32 an end elevational view showing the mounting of the bucking saw apparatus on the final haul road vehicle and the path of movement of the saw;

FIG. 33 a fragmentary sectional view taken substantially on the line 33—33 of FIG. 31 and showing the details of the drive arrangement for the bucking saw apparatus;

FIG. 34 a fragmentary side elevational view with parts in section for greater clarity and showing the engagement of the toothed drive wheel on the carriage of the bucking saw apparatus with the apertures provided in the supporting rails on the final haul road vehicle; and FIG. 35 a fragmentary elevational view with parts in section for greater clarity and showing the mounting and drive means for the bucking saw.

With continued reference to the drawings and particularly FIGS. 1 to 14, there is shown more or less diagrammatically the method and system for harvesting and transporting timber in accordance with this invention and as shown in FIG. 1, a suitable self-propelled vehicle 10 manned by a single operator is provided with a tree cutting means 11 in the form of a shear and with a combined tree pushing, delimbing, topping and gripping means 12. While the tree cutting means 11 is shown diagrammatically as a shear, it is to be understood that other suitable means, such as a chain saw, may be employed and, in fact, in the preferred form of the invention to be described more fully below, a chain saw is actually utilized. Since the type of cutting means employed has little bearing on the method of this invention, the same will be described in connection with a cutting means in the form of a shear.

As shown in FIG. 1, the vehicle 10 which is self-propelled is approaching a tree 13 which is to be felled and as shown in FIG. 2, the pusher 12 is engaged with the trunk of the tree 13 at a point above the point at which the cutting means 11 engages the tree. The cutting means 11 is operated to sever the tree adjacent the base thereof and at the same time, the pushing means 12 is operated to push the tree so that the same will fall in a desired location.

After felling of the tree, as shown in FIG. 3, the cutting means 11 is moved to inoperative position and the vehicle 10 may either be manipulated to straddle the tree 13 or may move along side the same. As the vehicle 10 moves longitudinally of the tree 13 from the butt end thereof toward the top, the jaws of the pusher means 12 are opened and since such jaws are provided with cutting edges on opposite ends thereof, such cutting edges are positioned as shown in FIG. 4, to engage and sever the limbs projecting outwardly from the upper side of the tree 13. As the vehicle 10 moves longitudinally of the tree 13 from the butt end toward the top end, a dog 14 attached to a cable 15 leading to a winch on the vehicle 10 engages the butt end of the tree 13 and upon reaching the top end of the tree 13, the jaws of the pusher, delimbing and gripper means 12 are closed to sever the top of the tree, as shown at 16 in FIG. 5. Also as shown in FIG. 5, the jaws of the combined pusher, delimber and gripper means 12 have been closed around the top of the tree 13 and the tree 13 may either be moved with respect to the vehicle 10 by operation of the winch and cable 15 which pulls on the dog 14 or the vehicle 10 may move from the top end toward the butt end of the tree 13 or a combination of such movement may be employed. This will result in the jaws moving along the trunk of the tree 13 from the top end toward the butt end to sever the remainder of the limbs therefrom, thereby providing a log 17 as shown in FIG. 6. Upon completion of removal of the limbs from the tree 13, the log 17 is gripped by the jaws of the means 12 adjacent the butt end thereof, as shown in FIG. 6, and the log 17 is transported by movement of the vehicle 10 to a position adjacent a cradle 18, as shown in FIG. 7 and suitable manipulation of the means 12 will operate to deposit the log 17 on the cradle 18 to form a bunch of logs 19 of the desired size.

With particular reference to FIG. 8, a pre-haul vehicle 20 constructed in accordance with this invention and to be more fully described below may be coupled to a suitable towing vehicle 21 and with the load-carrying body 22 of the pre-haul vehicle 20 tilted to the position shown in FIG. 8, the same is moved to a position with the rear end of the load-carrying body 22 disposed below the aligned butt ends of the bunch of logs 19 supported by the cradle 18. At this time, a cable 23 leading from a winch on the towing vehicle 21 is choked around the bunch of logs 19, as shown at 24, and operation of the winch to exert a pull on the cable 23 will result in skidding the bunch of logs 19 longitudinally and butt end first into the load carrying body 22 of the pre-haul vehicle 20 and at the same time, the body 22 of the pre-haul vehicle 20 will tilt upwardly toward the bunch of logs 19. As shown in FIG. 10, the bunch of logs 19 is fully loaded on the pre-haul vehicle 20 and if desired, the load carrying body 22 of the pre-haul vehicle 20 may be moved forwardly with respect to the supporting wheels in order to move the center of gravity of the load forwardly and support a greater portion of such load on the wheels of the pre-haul vehicle. However, normally the pre-haul vehicle will be utilized to transport the bunch of logs 19 with the top ends thereof dragging on the ground.

As shown in FIG. 11, a final haul road vehicle 25, usually in the form of a trailer, is located at a loading station and the pre-haul vehicle 20 is utilized to transport the bunch of logs 19 from the bunching location to the loading station. Upon reaching the loading station, the load-carrying body 22 of the pre-haul vehicle 20 is moved forwardly of the supporting wheels a sufficient distance to permit the weight of the bunch of logs 19 to tilt the pre-haul vehicle 20 to the position shown in FIG. 11 which serves to elevate the top ends of the bunch of logs 19 to facilitate loading of the same onto the final haul road vehicle 25. While movement of the center of gravity of the load on the pre-haul vehicle may be utilized to tilt the load-carrying body of the same, nevertheless, if desired, suitable power mechanism or manually operated mechanism may be provided for accomplishing this tilting operation. Upon reaching the loading station and with the top ends of the bunch of logs elevated as shown in FIG. 11, the pre-haul vehicle 20 is positioned in longitudinal alignment with the final haul road vehicle 25 and is backed into position with the top ends of the bunch of logs 19 disposed above the road vehicle 25 and supported by suitable means provided on the bucking saw apparatus 26, the structure of which is more fully described below. The pre-haul vehicle 20 is moved rearwardly with respect to the road vehicle 25 until a suitable coupling arrangement is operated to couple the pre-haul vehicle 20 to the road vehicle 25, at which time the load-carrying body 22 of the pre-haul vehicle 20 may be moved rearwardly and a pusher plate 27 provided on the pre-haul vehicle 20 operated to eject the bunch of logs 19 longitudinally onto the road vehicle 25. During this operation, the bucking saw apparatus 26 which is supporting the top ends of the bunch of logs 19 will move longitudinally on the road vehicle 25, as shown in FIG. 12, until the butt ends of the bunch of logs 19 reach the rear end of the load-carrying body 22 of the pre-haul vehicle 20, at which time the butt ends of the logs will drop onto the final haul road vehicle 25 in the position shown in FIG. 13. At this time the bucking saw apparatus 26 may be operated in a manner to be later described to cut off the top ends of the bunch of trees 19, thereby permitting the main portion of the logs to drop onto the body of the road vehicle 25, at which time the bucking saw apparatus 26 is utilized also in a manner to be later described to cut the logs into the desired lengths on the road vehicle 25.

Usually, approximately one-third of the total load for the road vehicle 25 is transported by the pre-haul vehicle 20 and loaded on the road vehicle 25 and, therefore, it normally will require three operations of the pre-haul vehicle 20 to completely load the road vehicle 25. The manner in which this successive loading operation is carried out is shown more or less diagrammatically in FIG. 14 in which a bunch of logs has been loaded on the road vehicle 25 and cut into desired lengths and a second bunch of logs 27 in loaded from the opposite end of the road vehicle 25 in order that the butt ends of the logs will alternate on the road vehicle 25 thereby providing a more or less even load.

Since the operation of the pre-haul vehicle 20 only requires a single operator and further, since the operation of the bucking saw apparatus 26 may be carried out by the driver of the towing vehicle for the final haul road vehicle 25 or if desired, by another person, the number of persons required to carry out the method of this invention and operate the system is maintained at a minimum which, of course, results in a material saving in labor costs. Furthermore, the system of this invention may be operated at a relatively rapid rate and a final haul road vehicle may be loaded, while another loaded road vehicle is traveling to the ultimate destination, it is possible to increase the production of pulp wood from the present average rate of approximately 0.22 cord per man hour to a relatively high rate of production of approximately two cords per man hour. Furthermore, the method and system of the present invention permits the handling of logs in tree lengths and movement thereof longitudinally which materially facilitates the handling and movement thereof when compared to present methods, as described above, and furthermore, the final haul road vehicle may accommodate a load of approximately ten cords in which the center of gravity is relatively low, thereby materially facilitating travel of the same over the road. It appears that a single directional tree felling, delimber, topper and log buncher, as well as a single pre-haul loader is sufficient to load two or more final haul road vehicles with one such vehicle always on the road, depending, of course, on the length of the haul to final destination.

In view of the above, it, therefore, appears that the method and system for harvesting and transporting timber, particularly pulp wood as described above, represents a very significant step forward in the art which serves to greatly reduce the manual labor necessary and also greatly reduce the cost of pulp wood production.

While, as stated above, any suitable cutting means may be employed for felling a tree, a sheer for this purpose being shown in FIGS. 1 to 7, but in all probability other cutting means, such as a chain saw will be preferable and one embodiment of a suitable chain saw and mounting means therefor is shown in FIGS. 15 and 16. As shown therein, the self-propelled vehicle 10 is provided on the forward end thereof with a mounting plate 28 from which projects forwardly a pintle disposed along a horizontal axis. Mounted on the pintle 29 for pivotal movement about a horizontal axis is a bracket 30 which serves to pivotally mount a swivel pin 31, the axis of which is disposed at right angles to the axis of the pintle 29. The bracket 30 is provided with an arm 32 which is pivotally connected at 33, as shown in FIG. 16, to the piston rod 34 of a hydraulic cylinder 35 which in turn is pivotally connected by a pin 36 to a suitable bracket 37 secured to the forward end of the vehicle 10. Operation of the hydraulic cylinder 35 serves to pivotally move the bracket 30 about the pintle 29.

A lever arm 38 extends outwardly from the swivel pin 31 and pivotally connected to the lever arm 38 at 39 is the piston rod 40 of a hydraulic cylinder 41 which in turn is pivotally connected at 42 to the bracket 30. Operation of the hydraulic cylinder 41 serves to pivotally move the swivel pin 31 about an axis at right angles to the axis of the pintle 29.

Pivotally mounted on the upper end of the swivel pin 31 at 43 is an elongated boom 44 and in order to swing the boom 44 about the pivotal mounting 43, a hydraulic cylinder 45 is provided which is pivotally mounted at 46 on a bracket 47 extending downwardly from the lower end of the swivel pin 31 and the piston rod 48 of the hydraulic cylinder 45 is pivotally connected at 49 to the boom 44.

A yoke 50 is provided on the end of the boom 44 remote from the bracket 30 and pivotally mounted in the yoke 50 is a plate 51 which is provided with a rearwardly extending lever arm 52 pivotally connected at 53 to the piston rod 54 of a hydraulic cylinder 55 which in turn is pivotally connected at 56 to the boom 44. Operation of the hydraulic cylinder 55 serves to tilt the plate 51 about an axis at right angles to the boom 44.

Secured to the plate 51 and depending therefrom is the shaft 57 of an oscillating hydraulic motor 58 and mounted on the motor 58 for movement therewith is a frame 59. Operation of the motor 58 will serve to pivotally move the frame 59 about the axis of the shaft 57. A slide 60 is carried by the frame 59 for slidable movement with respect thereto and in order to accomplish such slidable movement, a hydraulic cylinder 61 is pivotally connected at 62 to a bracket 63 on the frame 59 and the piston rod 64 of the cylinder 61 is pivotally connected at 65 to a bracket 66 extending upwardly from the slide 60. Consequently, operation of the cylinder 61 will operate to move the slide 60 with respect to the frame 59. The slide 60 may be provided with an upwardly curved forward end portion 67 to facilitate movement thereof with respect to the ground.

Mounted on the slide 60 between the frame 59 and the forward end of the slide 60 is a supporting blade 68 around which travels a chain saw 69 and a hydraulic or other suitable motor 70 is provided for driving the chain saw 69. As clearly shown in FIG. 16, the blade 68 and chain saw 69 extends laterally at substantially right angles to the slide 60 and the blade 68 and chain saw 69 is mounted for relative pivotal movement with respect to the slide 60 and such pivotal movement is controlled by a hydraulic buffer or dashpot in the form of a cylinder 71 pivotally mounted at 72 on the slide 60 and having a piston rod 73 pivotally connected at 74 to a lever arm 75 extending from the mounting 76 for the blade 68 and chain saw 69. A fluid pressure accumulator 77 may be connected to a suitable conduit 78 to the cylinder 71 to facilitate operation thereof. In this manner, the blade 68 and chain saw 69 may yield to a limited degree during a cutting operation which reduces the possibility of the saw becoming jammed.

Obviously, the position and attitude of the blade 68 and chain saw 69 may be controlled by operation of the various hydraulic cylinders with the cylinder 61 being utilized to move the slide 60 for the purpose of advancing the saw 69 through a tree to cut the same and after completion of the cutting operation, the saw and supporting structure may be moved to an inoperative position to permit use of the vehicle for another purpose now to be described.

With particular reference to FIGS. 17 and 18, a bracket 79 is pivotally mounted on the vehicle 10 for movement about a horizontal axis by means of a pintle 80 and as shown in FIG. 18, the bracket 79 is provided with a transversely extending lever arm 81 to which is pivotally connected as at 82 the piston rod 83 of a hydraulic cylinder 84 which in turn is pivotally connected at 85 to a bracket 86 mounted on the vehicle 10. Operation of the hydraulic cylinder 84 serves to pivotally move the bracket 79 about the horizontal axis of the pintle 80.

Mounted in the bracket 79 for movement about an axis at right angles to the axis of the pintle 80 is a swivel pin 87 and provided on the pin 87 and extending therefrom is a lever arm 88 to which is pivotally connected at 89 the piston rod 90 of a hydraulic cylinder 91 which in turn is pivotally connected at 92 to the bracket 81. Operation of the hydraulic cylinder 91 serves to pivotally move the swivel pin 87 about an axis at right angles to the axis of the pintle 80.

An extensible and retractable boom 93 is provided with an inner end or base portion 94 which is pivotally connected at one end 95 thereof to the swivel pin 87 and the boom 93 is provided with an outer portion 96 slidably and nonrotatably received in the inner portion 94, the outer portion 96 terminating in a yoke 97. In order to extend and retract the outer portion 96 of the boom 93, a hydraulic cylinder 98 is pivotally connected at 99 to the inner portion 94 of the boom 93 and the piston rod 100 of the hydraulic cylinder 98 is pivotally connected at 101 to a bracket 102 fixed to the outer portion 96 of the boom 93 adjacent the yoke 97. Obviously, operation of the hydraulic cylinder 98 will serve to extend and retract the outer portion 96 of the boom 93 with respect to the inner portion 94 of the boom 93.

Pivotally mounted in the yoke 97 is a block 103 and such block is provided with a lever arm 104 which is pivotally connected at 105 to the piston rod 106 of a hydraulic cylinder 107 which in turn is pivotally connected at 108 to the bracket 102 on the outer portion 96 of the boom 93. Operation of the hydraulic cylinder 107 serves to tilt the block 103 about the mounting thereof.

Connected to the block 103 and depending therefrom is the shaft 109 of an oscillating hydraulic motor 110 and mounted on the motor 110 for movement therewith is a frame 111. Secured to the frame 111 is the shaft 112 of an oscillating hydraulic motor 113 and the shaft 114 of a second oscillating hydraulic motor 115 is secured to the bracket 111 in axial alignment with the shaft 112 of the motor 113. An elongated concave jaw 116 is fixed to the motor 113 for movement therewith and an elongated concave jaw 117 is fixed to the motor 115 for movement therewith and the jaw 117 is in opposition to the jaw 116 as a result of which, upon operation of the motors 113 and 115, the jaws 116 and 117 move toward or away from each other, but as clearly shown in FIG. 17 the jaws 116 and 117 are displaced axially with respect to each other. The jaw 116 is provided with cutting edges 118 and 119 at opposite ends thereof and in a similar manner, the jaw 117 is provided with cutting edges 120 and 121 at opposite ends thereof. Also mounted on the frame 111 is an outwardly extending cutting blade 122 which extends axially of the jaws 116 and 117 and the purpose and operation of the cutting blade 122, as well as the purpose and operation of the cutting edges on the ends of the jaws 116 and 117 will be later described.

FIG. 19 shows the relationship of the jaws 116 and 117 and further reference will be made to this figure in connection with the description of the operation of this feature of the invention. With particular reference to FIG. 20, there is shown a winch 123 which may be operated by a hydraulic motor, not shown, or in any other desired manner, such winch 123 being mounted on the frame 111 and a cable 124 extends through a funnel member 125 pivotally mounted at 126 on a bracket 127 secured to the frame 111. The cable 124 is attached to a fitting 128 on which is swiveled a log-engaging dog 129 and position 1 in full lines in FIG. 20 shows the dog 129 in retracted inoperative position and position 2 in dotted lines shows the dog 129 in position to engage the butt end of a log in a manner to be later described.

FIG. 21 shows the hydraulic circuit for the various hydraulic cylinders and hydraulic motors and FIG. 22 shows an electrical circiut for controlling the operation of the hydraulic circuit shown in FIG. 21. These operating and control circuits are entirely conventional and consequently, the same will not be described in detail, but only the major parts thereof will be described in connection with the operation and control of the saw, as well as the operation and control of the tree pushing, delimbing, topping and tree moving means, the structure of which has been described above.

In describing the nature and operation of the hydraulic and electrical circuits shown in FIGS. 21 and 22, it is to be noted that the numbers from 1 to 14 appearing in boxes on FIG. 22 correspond to the same numbers appearing in circles on FIG. 21 and represent solenoid operated valves. Also the numbers 1 to 14 appearing above the curved lines with arrows at each end in FIG. 22 represent switches for controlling the operation of the solenoid valves 1 to 14. The switches 1 to 14 are of the type which are normally open, or in other words, are spring biased to center position and such switches may be operated in either direction to cause operation of the solenoid valves in a manner to cause movement of the hydraulic cylinders controlled thereby in either direction. The electrical control circuit of FIG. 22 is provided with power from a suitable AC generator mounted on the self-propelled vehicle and this generator may, if desired, be of sufficient capacity to also provide a source of power for other uses.

Suitable power driven pumps, 130, 131, 132, 133 and 134 are provided on the self-propelled vehicle for supplying fluid under pressure for operating the various drive motors and also the hydraulic cylinders. Operation of the cylinder 35 for pivotally moving the bracket 30 about the pintle 29 is controlled by the solenoid valve 14 which in turn is controlled by the switch 14 in the electrical circuit. Pivotal movement of the swivel pin 31 is provided by operation of the hydraulic cylinder 41 which in turn is controlled by the solenoid valve 4 and the switch 4. Raising and lowering of the saw supporting boom 44 is provided by the cylinder 45 which in turn is controlled by the solenoid valve 5 and the switch 5. The cylinder 55 serves to tilt the plate 51 and the operation of the cylinder 55 is controlled by the solenoid valve 10 which in turn is controlled by switch 10. Operation of the oscillating hydraulic motor 58 to swing the frame 59 and slide 60 is controlled by operation of the solenoid valve 9 which in turn is controlled by switch 9. The hydraulic cylinder 61 which serves to actuate the slide 60 is controlled by operation of the solenoid valve 6 which in turn is controlled by the switch 6. The hydraulic drive motor 70 for the chain saw 69 is of the reversible type in order to free the saw in the event of jamming thereof and such drive motor 70 is controlled by the solenoid 1 which in turn is controlled by the switch 1.

The hydraulic cylinder 84 provides for pivotal movement of the bracket 79 about the pintle 80 and actuation of the cylinder 84 is controlled by solenoid valve 13 which in turn is controlled by switch 13. The hydraulic cylinder 91 provides for pivotal movement of the swivel pin 87 and operation of the cylinder 91 is controlled by solenoid valve 2 which in turn is controlled by switch 2. Raising and lowering the gripper supporting boom 93 is provided by the hydraulic cylinder 135 which is pivotally connected at 136 to a fitting 137 mounted on the swivel pin 87 and the piston rod 138 of the cylinder 135 is pivotally connected at 139 to a bracket 140 mounted on the inner portion 94 of the extensible and retractable boom 93. Operation of the motor 135 is controlled by the solenoid valve 3 which in turn is controlled by the switch 3. The hydraulic cylinder 98 serves to extend and retract the outer portion 96 of the boom 93 and operation of the cylinder 98 is controlled by the solenoid valve 7 which in turn is controlled by switch 7. Movement of the block 103 pivotally mounted in the yoke 97 of the boom 93 is provided by the hydraulic cylinder 107, the operation of which is controlled by solenoid valve 12 which in turn is controlled by switch 12. The oscillating hydraulic motor 110 for moving the frame 111 in either direction is controlled by solenoid valve 11 which in turn is controlled by switch 11. The oscillating hydraulic motors 113 and 114 are connected in series as shown in FIG. 21 and operation of these motors is controlled by solenoid valve 8 which in turn is controlled by switch 8.

It will, therefore, be seen from the above description that there has been provided a combined hydraulic and electrical control system for operation of the unitary directional tree feller, delimber, topper and log moving apparatus in which all of the controls may be concentrated at a location convenient to the operator and by reason of this fact, a single operator may conveniently control all of the operations of this apparatus and the controls for the self-propelled vehicle may be so arranged as to be operated by the feet of the operator.

In the operation of the unitary tree feller, delimber, topper and log moving apparatus, the blade 68 and chain saw 69 is disposed in a position substantially perpendicular to the tree to be felled and at the desired distance above the ground operation of the various hydraulic cylinders and motors associated with the supporting means for the saw, it being, of course, assumed that the vehicle has previously been positioned adjacent the tree to be felled and at the same time, the extensible and retractable boom 93 is so positioned that the jaws 116 and 117 which are opened to position 1 as shown in dotted lines in FIG. 19, engages the trunk of the tree at a point above the location of the saw cut. The extensible and retractable boom 93 is operated by means of the hydraulic cylinder 98 to exert a pushing force on the tree in the desired direction of fall and the hydraulic cylinder 61 is actuated to move the slide 60 and saw 69 carried thereby toward the tree to cut the same. A continuous pushing force is applied to the tree during the cutting operation resulting in felling of the tree in the desired direction. After the tree has been felled and is lying on the ground, the jaws 116 and 117 still in the open position 1, as shown in FIG. 19, is moved into close proximity with the upper surface of the tree which also brings the blade 122 into such a location. At this time the vehicle is moved longitudinally of the tree, either straddling the same or at one side thereof and this movement serves to sever branches from the upper portion of the tree by the action of the blade 22, as well as the cutting edges 119 and 129 on the leading edges of the jaws 116 and 117, respectively. Also when commencing movement of the vhicle longitudinally of the tree to start the delimbing operation, the winch 123 is actuated to pay out the cable 124 which will result in the funnel member 125 and tree engaging dog 129 moving to the dotted line position shown in FIG. 20, at which time, the dog 129 will engage the butt of the tree and the cable 124 will be further payed out as the vehicle moves along the tree. Upon reaching the top end of the tree, the oscillating hydraulic motors 113 and 115 are operated to move the jaws 116 and 117 to position 3 shown in dotted lines in FIG. 19 and this operates to sever the top of the tree from the trunk. Upon completion of the toping operation, the jaws 116 and 117 are moved to position 2 shown in full lines in FIG. 19 in which position the jaws 116 and 117 substantially surround the trunk of the tree. At this time, the winch 123 is operated to exert a pull on the cable 124 and dog 129 which will result in skidding the tree longitudinally through the jaws 116 and 117 which in turn will result in removing the remainder of the branches from the tree. While the winch 123, cable 124 and dog 129 may be utilized as the sole means to move the tree to the jaws 116 and 117, if desired, this movement may also be combined with a rearward movement of the vehicle which will increase the speed of this operation.

Upon completing of the delimbing operation, the jaws 116 and 117 will be positioned adjacent the butt end of the tree and the oscillating motors 113 and 115 will be operated to cause the jaws 116 and 117 to grip the log and the boom 93 may be operated the raise the log above the ground and the vehicle 10 utilized to move the log to a desired location at which point the log may be deposited on the cradle 18 as shown in FIG. 7 and described above in connection with the method and system of this invention. It is also to be noted that at the completion of the delimbing operation, the dog 129 automatically disengages from the butt of the log and operation of the winch 123 will serve to pull the dog 129 into the funnel member 125 and return the same to the full line position shown in FIG. 20.

It will thus be seen that there has been provided a single unitary apparatus which may be conveniently operated by a single operator to perform the functions of directionally felling a tree, delimbing and topping the same and moving the resulting log to a desired location and depositing the same on a cradle to form a bunch of logs of the desired size which thereafter may be handled as a unit in a manner to be later described.

While as described above the jaws 116 and 117 mounted on the extensible and retractable boom 93 may be utilized to engage the trunk of a tree to be felled and to exert a force thereon in the desired direction of felling, if desired, an entirely separate tree pushing means may be mounted on the self-propelled vehicle 10 which will be operative to engage the tree and push the same in the desired direction of felling.

Since a protective framework will be provided on the self-propelled vehicle 10 to cover and protect the operator from falling limbs or other debris and also to prevent fouling or snags of the superstructure of the vehicle with brush or the like, this protective framework may be utilized as a support for the separate tree pushing means which may well take the form of a slidable or extensible and retractable framework or rod having on the forward end thereof a tree engaging member which may, if desired, be serrated or formed in any other manner to engage a tree without slipping and the pushing means may be operated hydraulically or in any other desired manner. Furthermore, if desired, the pushing means may be provided with a suitable spring or other cushioning means to absorb an initial impact with tree to ease the shock resulting therefrom and/or to prevent damage to the apparatus. It follows, of course, that this separate pushing means must be manufactured and installed in such manner as to have sufficient strength and rigidity to withstand forces resulting from operation thereof and also to withstand impacts from falling limbs of trees.

The method and system described above included the use of a self-loading and unloading pre-haul vehicle 20 and the details of structure of such pre-haul vehicle are shown in FIGS. 23 to 28. With particular reference to these figures it will be seen that the pre-haul vehicle comprises an axle 141 on which are mounted ground-engaging wheels 142 and also mounted on the axle 141 is a frame 143. The frame 143 is provided with a generally circular upper portion 144 which serves to provide a support for a fifth wheel 145. The fifth wheel 145 is rotatably mounted on the portion 144 of the frame 143 by a sleeve 146 extending through aligned apertures in the fifth wheel 145 and portion 144 and it will be noted from an inspection of FIG. 25, that the sleeve 146 is slightly longer than the thickness of the fifth wheel 145 and the portion 144 of the frame 143. Washers 147 and 148 engage the ends of sleeve 146 and the washers 147 and 148 as well as the sleeve 146 are clamped in position by a bolt 149 extending therethrough.

The frame 143 is provided with a cross member 150 to which is secured by welding or any other suitable means one portion 151 of a drawbar 152. As best shown in FIGS. 23 and 27 the drawbar 152 is made up of an outer member 151 within which is telescopically received an inner member 153 and a series of apertures 154 are provided in the outer member 151 and a series of apertures 155 are provided in the inner member 153. The drawbar 152 may be adjusted to any desired length and maintain in such adjusted position by a pin 156 which may extend through aligned apertures 154 and 155 and prevent it from removal by a cotter pin or other suitable means 157.

The forward end of the inner member 153 of the drawbar 152 may be provided with a swivel coupling member for coupling the drawbar 152 to the drawbar 158 of a towing vehicle and with particular reference to FIG. 28, the swivel coupling means may well comprise an eye 159 having a shank 160 provided with a reduced portion 161 which is clamped between the two halves 162 and 163 which are secured together by screw threaded fastening means or the like 164 and serve to provide a block which is secured in the end of the inner drawbar member 153 and will, obviously, permit swivel movement of the eye 159. The eye 159 may be coupled to the drawbar 158 of the towing vehicle by means of a suitable pin 165 extending through apertures in the drawbar 158 and through the eye 159.

The upper surface of the fifth wheel 145 is provided with spaced upstanding lugs 166 and 167 and a chassis 168 is provided with spaced downwardly extending ears 169 and 170 which serve to receive bolts or other suitable means 171 and 172 respectively extending through the lugs 166 and 167 to pivotally mount the chassis 168 on the fifth wheel 145 for pivotal movement about a horizontal axis. It is to be noted that the pivotal mounting of the chassis 168 is approximately midway of the length thereof as clearly shown in FIG. 23.

The chassis 168 may be provided with upstanding side members 173 and 174 and mounted on such side members and extending longitudinally of the chassis 168 are rails 175 and 176.

An elongated load-carrying body 22 is provided with a bottom wall 177 and sidewalls 178 and 179 and the load-carrying body 22 is open at opposite ends. Transversely spaced longitudinally extending slides 180 and 181 are secured to the bottom wall 177 of the load-carrying body 22 and such slides 180 and 181 engage the rails 175 and 176 to mount the load-carrying body 22 for longitudinal sliding movement with respect to the chassis 168 and it will be noted from an inspection of FIG. 23, that the length of the load-carrying body 22 is greater than the length of the chassis 168. Racks 182 and 183 are provided on the slides 180 and 181 and such racks mesh with pinion gears 184 and 185 fixed to a shaft 186 which is rotatably mounted on the chassis 168. As best shown in FIGS. 23 and 25, a sprocket 187 is fixed to the outer end of the shaft 186 and a chain 188 trained over the sprocket 187 also engages a sprocket 189 mounted on the drive shaft of a suitable motor 190 which is carried by the chassis 168. Consequently, operation of the motor 190 will serve to move the load-carrying body 22 in either direction longitudinally with respect to the chassis 168.

A generally rectangular pusher plate 191 is disposed between the sidewalls 178 and 179 of the load-carrying body 22 and as best shown in FIGS. 25 and 26, longitudinally extending rails 192 and 193 are provided on the sidewalls 178 and 179 adjacent the bottom wall 177 and the rails 192 and 193 serve to engage slides 194 and 195 on the pusher plate 191 thereby mounting such pusher plate for longitudinal movement in either direction with respect to the load-carrying body 22. The pusher plate 191 is provided with a centrally disposed slot 196 in the upper edge thereof and secured to the pusher plate 191 in alignment with the slot 196 is a rotatably mounted idler pulley 197. The purpose and operation of the slot 196 and pulley 197 will be later described in connection with the operation of the pre-haul vehicle.

In order to move the pusher plate 191 longitudinally with respect to the load-carrying body 22, there may be provided a suitable drive motor 198 mounted on the load-carrying body 22 and to the drive shaft of which is connected a shaft 199 having sprockets 200 and 201 fixed thereto. It is to be noted that the shaft 199 is located adjacent one end of the load-carrying body 22 and disposed outwardly of the opposite end of the load-carrying body 22 is a rotatably mounted roller 203 and also idler sprockets 204 and 205 which are in alignment with sprockets 200 and 201. Chains 206 and 207 are trained over the sprockets 200 and 201, as well as the sprockets 204 and 205 and also over suitable idler sprockets 206 and 207 and as will be seen from an inspection of FIG. 25, the upper runs of the chains 206 and 207 are disposed above the bottom wall 177 of the load-carrying body 22 while the lower runs of such chains are disposed below the bottom wall 177 of the load-carrying body 22. As shown in FIG. 23, the opposite ends 208 and 209 of the chains 206 and 207 are connected to a suitable fitting 210 on the frame 211 supporting the pusher plate 191 and, therefore, it will be seen that operation of the motor 198 will serve to move the pusher plate 191 longitudinally of the load-carrying body 22 from one end to the other and in view of the disposition of the sprockets 204 and 205 outwardly of the end 211 of the load-carrying body 22, the pusher plate 191 may move to a position substantially flush with the end 211 of the load-carrying body 22 for a purpose which will later appear.

Also provided on the chassis 168 and extending rearwardly thereof are a pair of coupling members 212 which are provided with downwardly opening generally U-shaped slots 213 and the purpose and operation of such coupling members will be later described.

In the operation of the pre-haul vehicle 20 as described above in connection with the method and system of this invention, it will be seen that upon operation of the motor 190, the load-carrying body 22 may be moved rearwardly to dispose the center of gravity thereof to the rear of the axle 141 which will result in tilting of the rear end of the load-carrying body 22 downwardly, whereupon the same may be disposed below the butt ends of a bunch of logs 19 disposed on the cradle 18. The cable 23 extends over the idler pulley 197 and through the slot 196 in the pusher plate 191 which is disposed adjacent the forward end of the pre-haul vehicle and upon choking the cable 23 to the bunch of logs 19 a pulling force on the cable 23 will result in pulling the logs into the load-carrying body 22 of the pre-haul vehicle through the end 211 thereof. The logs may be pulled into a position where the butt ends thereof are in engagement with the pusher plate 191 and operation of the motor 190 will serve to move the load-carrying body 22 forwardly to position the center of gravity of the load substantially over the axle 141. In this condition, the pre-haul vehicle 20 may be utilized to transport the bunch of logs 19 to a loading station and the remainder of the operation of the pre-haul vehicle will be described below in connection with a final haul road vehicle disposed at the loading station.

The final haul road vehicle 25 and the bucking saw apparatus 26 generally described above in connection with the method and system of this invention are shown in detail in FIGS. 29 to 35 and as shown in these figures, the final haul road vehicle 25 may well include a chassis 214 having ground engaging wheels 215, a temporary support means 216 and a fifth wheel 217 which is all substantially conventional trailer structure. Mounted on the chassis 214 are spaced longitudinally extending frame members 218 and 219 and mounted on the frame members 218 and 219 are a pair of transversely extending log supporting bunks 220 and 221 disposed substantially midway of the length of the final haul road vehicle. Additional pairs of logs supporting, transversely extending bunks 222 and 223, 224 and 225, 226 and 227, 228 and 229, 230 and 231 and 232 and 233 are disposed on the frame members 218 and 219 and as will be clearly seen from an inspection of FIG. 29 the height of the bunks decreases from the center pair 220 and 221 to the opposite end pairs 230 and 231 and 232 and 233. The purpose of this decrease in height of the log supporting bunks will be later described. Side frame structure 234 and 235 extends upwardly from the opposite ends of the transversely extending log supporting bunks and mounted on the upper ends of the side frame structures 234 are longitudinally extending rails in the form of I bars 236 and 237. If desired, diagonal brace members 238 may be provided between the adjacent upstanding frame structure 234 and 235 in order to provide additional strength and rigidity for the vehicle. Upstanding members 239 and 240 are provided on opposite sides at opposite ends of the final haul road vehicle 25 and the upstanding members 239 and 240 are provided with a series of apertures 241 and 242 to selectively receive cross rods 243 and 244, the purpose of which will be later described. It is also to be noted, that the upstanding side frame members 234 and 235 extending upwardly from each pair of log supporting bunks are spaced a short distance to, in effect, provide vertical slots 245 between the bunks of each pair and the purpose of such slots will later appear.

The bucking saw apparatus indicated generally at 26, comprises a generally rectangular carriage composed of longitudinally extending side members 246 and 247 connected by cross members 248 and 249. Wheels 250 and 251 rotatably mounted on the side members 246 and 247 engage the upper surfaces of the rails 236 and 237 and toothed wheels 252 and 253 fixed to a cross shaft 254 which is mounted for rotation in the side members 246 and 247 also engage the rails 236 and 237. As more clearly shown in FIGS. 33 and 34, the teeth 255 of the toothed wheels 252 and 253 engage in apertures 256 in the rails 236 and 237 and the toothed wheels 252 and 253, together with the wheels 250 and 251 provide a support for the carriage which permits movement thereof longitudinally of the rails 236 and 237 on the upper edges of the side frame structure of the final haul road vehicle 25. In order to move the carriage along the rails 236 and 237 in either direction, there may be provided a suitable drive motor 257 mounted on the carriage which is connected through a chain 258 to the cross shaft 254 and operation of the motor 257 will thereby cause movement of the carriage along the rails 236 and 237. The motor 257 may be provided with power from any suitable source.

A pair of upstanding members 259 and 260 are fixed to the side members 246 and 247 and the upstanding members 259 and 260 serve to rotatably support the outer ends of upwardly and outwardly inclined log supporting rollers 261 and 262. The inner ends of the rollers 261 and 262 are supported in suitable bearings on the cross member 248 and between the inner ends of the rollers 261 and 262 is a horizontal log supporting roller 263 also rotatably mounted on the cross member 248. In a similar manner, a second pair of upstanding members 264 and 265 are fixed to the side members 246 and 247 in longitudinally spaced relationship to the first pair of upstanding members 259 and 260 and the upstanding members 264 and 265 serve to rotatably support the outer ends of upwardly and outwardly extending log supporting rollers 266 and 267. The inner ends of the rollers 266 and 267 are rotatably supported in bearings mounted on the cross member 249 and a horizontal log supporting roller 268 is also rotatably mounted on the cross member 249 between the inner ends of the rollers 266 and 267.

The side members 246 and 247 project outwardly in opposite directions from the cross members 248 and 249 an appreciable distance as clearly shown in FIGS. 29 and 30 and as particularly shown in FIG. 31, there may be provided at the opposite outer ends of the side members 246 and 247 a log supporting cross bar 269 which may be secured at opposite ends to the side members 246 and 247 by means of brackets 270 and 271 and pins 272 and 273, either of which is removable to permit the bar 269 to be pivotally moved from a position extending between the sidebars 246 and 247 to a position adjacent to and parallel with one of the sidebars. Also, if desired, a plurality of longitudinally spaced log supporting cables 274 and 275 may be removably secured by hooks 276 and 277 to the sidebars 246 and 247 and extending therebetween as clearly shown in FIG. 31. The purpose and operation of the crossbar 269 and the cables 274 and 275 will be later described.

It is to be noted that as clearly shown in FIG. 31, the sidebars 246 and 247 are provided with downwardly projecting flanges 278 and 279 which slidably engage the outer sides of the rails 236 and 237 and the side members 246 and 247 are also provided with inner downwardly extending slide members 280 and 281 which engage the inner sides of the rails 236 and 237. The flanges 278 and 279, as well as the slide members 280 and 281 serve to prevent outward or inward movement of the upper edges of the side frame structure of the final haul road vehicle 25, thereby maintaining the rails 236 and 237 in alignment to permit free movement of the carriage for the bucking saw apparatus therealong.

A pair of longitudinally spaced transversely extending threaded rods 282 and 283 are rotatably mounted on the side members 246 and 247 and one of the rods 282 may be provided with a suitable hand-engaging crank 284 which will facilitate manual rotation of the same and the rod 282 may be connected to the rod 283 by a chain 285 which will cause simultaneous rotation of the rods 282 and 283 upon rotation of the crank 284. As best shown in FIGS. 33 and 35, a platform 286 is provided on the underside thereof with nuts 287 and 288 which are received on and threadedly engage the threaded rods 282 and 283 to support the platform 286 thereon and permit movement thereof in either direction between the side members 246 and 247 upon rotation of the threaded rods 282 and 283. Mounted on the platform 286 is a hydraulic motor 289 and also mounted on the platform 286 in axial alignment with the motor 289 is a second hydraulic motor 290. The motor 289 is provided with a hollow drive shaft 291 and the motor 290 is provided with a drive shaft 292 which extends through the hollow drive shaft 291. The motor 289 is of the oscillating type and mounted on the outer end of the hollow drive shaft 291 of motor 289 for swinging movement in a vertical plane upon movement of the shaft 291 is a supporting blade 292' for a chain saw 293 which travels around the balde 292' in a conventional manner. A drive sprocket 294 for the chain saw 293 is mounted on the shaft 292 of the motor 290 and obviously, operation of such motor will serve to drive the chain saw 293.

As previously mentioned, the pre-haul vehicle 20 is utilized to transport a bunch of logs 19 to a loading station at which a final haul road vehicle 25 has been positioned and the pre-haul vehicle 20 is utilized to load a first bunch of logs 19 from one end of the road vehicle 25, a second bunch of logs from the opposite end of the road vehicle 25 and a third bunch of logs from the first end of the road vehicle 25. Preparatory to loading of the road vehicle 25, the carriage of the bucking saw apparatus 26 is moved to the end of the road vehicle 25 from which the bunch of logs 19 is to be loaded and the cables 274 and 275 are removed from that end of the bucking saw apparatus 26 and the log supporting crossbar 269 is moved out of the way to a position adjacent to and parallel with one of the side members 246 or 247. As shown in FIG. 11, the center of gravity of the load of logs 19 on the pre-haul vehicle 20 is shifted in a manner to tilt the load-carrying body 22 of the pre-haul vehicle 20 in a manner to raise the top ends of the logs 19 above the ground and the pre-haul vehicle 20 is longitudinally aligned with the final haul vehicle 25 and backed toward the same with the top ends of the bunch of logs 19 extending over the road vehicle 25 and engaging the log supporting rollers 261, 262 and 263 or the rollers 266, 267 and 268 depending from which end of the road vehicle 25 the logs are being loaded. The pre-haul vehicle 20 continues to move rearwardly toward the final haul vehicle 25 with the carriage supporting the log supporting rollers moving with the logs engaging the rollers until such time as the slots 213 in the coupling means 212 engage over the crossbar 244 or 243 positioned in the correct apertures 241 or 242 and upon engagement of the slots 213 with the rod 243 or 244, the pre-haul vehicle 20 is coupled to the final haul road vehicle 25 and at this time, the pusher plate 191 of the pre-haul vehicle 20 is operated to eject the bunch of logs 19 longitudinally of the pre-haul vehicle 20 and onto the final haul road vehicle 25 as shown in FIG. 12 until the butt ends of the logs clear the roller 203 on the rear end of the pre-haul vehicle 20 at which time, the butt ends of the logs will drop downwardly onto the supporting bunks of the final haul road vehicle 25 and the logs 19 will occupy the position shown in FIG. 13. At this time, the coupling means 212 on the pre-haul vehicle 20 is released from the crossbar 243 or 244 and the pre-haul vehicle 20 may return for another load.

Previous to loading of the bunch of logs 19 on the final haul road vehicle 25, the oscillating hydraulic motor 289 is operated to move the blade 292' and chain saw 293 upwardly to the position shown in dotted lines at 295 in FIG. 32 and upon completion of the loading operation, the bucking saw apparatus 26 will be disposed at the end of the final haul road vehicle 25 adjacent the top ends of the logs 19 but inwardly therefrom as shown in FIG. 13. At this time, the chain saw drive motor 290 is energized to drive the chain saw 293 and the motor 289 is operated to move the chain saw 293 into engagement with the logs 19 to sever the top ends thereof and permit the major portion of the logs 219 to drop downwardly onto the log supporting bunks of the road vehicle 25. At this time, the top ends of the logs 219 will drop downwardly and be supported by the crossbar 269 and cables 274 and 275 extending between the side members 246 and 247 of the bucking saw apparatus 26. The bucking saw apparatus 26 may then be moved longitudinally of the road vehicle 25 to position the top ends of the logs over such vehicle and the cables 274 and 275, as well as the crossbar 269 may be moved out of the way to permit the top ends of the logs to drop downwardly and come to rest on the logs previously deposited on the log supporting bunks of the road vehicle 25. The bucking saw apparatus 26 may now be positioned with the chain saw 293 located in alignment with one of the slots 245 or spaces between adjacent upstanding side frame members 234 of a pair of log supporting bunks and the chain saw 293 may be swung through an arc and traversed across the road vehicle 25 as shown diagrammatically in FIG. 32 to cut the entire load of logs into a desired length and this cutting operation may be repeated by moving the carriage of the bucking saw apparatus 26 longitudinally of the road vehicle 25 to position the saw 293 successively in alignment with each slot or space 245 which serves to locate the saw 293 for accurately cutting the entire load of logs into the desired lengths. During this cutting operation and due to the fact that the height of the log supporting bunks decreases from the center of the road vehicle 25 toward each end as described above, the length of logs as the same are cut will tend to move downwardly and come to rest on the lower log supporting bunks thereby spreading the ends of the logs at the point of cut to prevent jamming of the chain saw 293 during the cutting operation.

The loading and bucking of the logs into desired lengths will proceed as described above, for each successive load of logs deposited on the final road vehicle 25 and these operations will continue until the road vehicle 25 is completely loaded, at which time the same may be coupled to a towing tractor and utilized to transport the logs to their ultimate destination. In the meantime loading and bucking operations may proceed on a second final haul road vehicle.

While the bucking saw apparatus has been described above as installed on the final haul road vehicle and it is entirely practical to utilize this structure and operate the same in the manner as described above, nevertheless, in certain instances it may be desired to provide a separate bucking saw apparatus in which case, such apparatus may be mounted on a separate vehicle which may be moved alongside the final haul road vehicle longitudinally thereof to position the bucking saw apparatus at the desired points for cutting the logs on the road vehicle to the desired length but in any event, the bucking operation contemplated by this invention is intended to take place on the road vehicle, rather than at a separate point which would necessitate loading short lengths of logs onto the vehicle. In this manner, both the loading and bucking operations are materially facilitated and operate to provide a material contribution to the reduction of cost in the production of pulp wood.

It will be seen that by the above described invention there has been provided a highly efficient harvesting and transporting method and system for timber, particularly as concerns the production of pulp wood and furthermore, there has been described apparatus which is operative to carry out the steps of the method and to provide the apparatus comprising the system and while various design changes may be made in the apparatus, the apparatus disclosed is entirely practical for the use intended and represents an adequate disclosure of this portion of the invention.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A method of harvesting and transporting timber, said method comprising the steps of providing a unitary directional tree felling, delimbing, topping and log moving apparatus, utilizing said apparatus to cut a tree adjacent the ground while simultaneously exerting a pushing force on said tree at a point spaced above the cutting point, said force being exerted in a direction to fell said tree in a desired location, utilizing said apparatus to remove the limbs on the upper side of said felled tree and sever the top and to thereafter remove the remainder of the limbs to provide a log, utilizing said apparatus to grasp said log adjacent the butt end to move the same to a location adjacent a supporting cradle and deposit said log on said cradle, directionally felling and delimbing additional trees and depositing additional logs on said cradle to form a bunch of logs of the desired size with the butt ends substantially in alignment, providing a self-loading and unloading pre-haul vehicle, loading said bunch of logs as a unit by skidding the same longitudinally from said cradle onto said vehicle from the rear toward the front to position the butt ends of said logs adjacent the front of said vehicle and with the top ends of said logs projecting from the rear of said vehicle, providing a final haul road vehicle having a bucking saw apparatus mounted thereon for longitudinal movement, moving said pre-haul vehicle to a position at one end of said road vehicle with the top ends of said logs overhanging a portion of said road vehicle, ejecting said logs as a unit longitudinally from said pre-haul vehicle onto said road vehicle with the butt ends of said logs disposed at said one end of said road vehicle, utilizing said saw apparatus to cut said logs into predetermined lengths on said road vehicle, utilizing said pre-haul vehicle to load a second bunch of logs on said road vehicle from the opposite end with the butt ends of said second bunch of logs disposed at said opposite end of said road vehicle, utilizing said saw apparatus to cut said second bunch of logs into predetermined lengths on said road vehicle, utilizing said pre-haul vehicle to load a third bunch of logs on said road vehicle from said one end with the butt ends of said third bunch of logs disposed at said one end of said road vehicle and utilizing said saw apparatus to cut said third bunch of logs into predetermined lengths on said road vehicle to complete loading thereof.

2. A method of harvesting and transporting timber as defined in claim 1, including the additional step of supporting the top ends of said logs as the same are moved longitudinally onto said road vehicle.

3. A method of harvesting and transporting timber, said method comprising the steps of providing a unitary directional tree-felling delimbing, topping and log moving apparatus, utilizing said apparatus to cut a tree adjacent the ground while simultaneously exerting a pushing force on said tree at a point spaced above the cutting point, said force being exerted in a direction to fell said tree in a desired location, utilizing said apparatus to remove the limbs on the upper side of said felled tree and sever the top and to thereafter remove the remainder of the limbs to provide a log, utilizing said apparatus to grasp said log adjacent the butt end and move the same to a location adjacent a supporting cradle and deposit said log on said cradle, directionally felling and delimbing additional trees and depositing additional logs on said cradle to form a bunch of logs of the desired size with the butt ends substantially in alignment, providing a self-loading and unloading pre-haul vehicle, loading said bunch of logs as a unit by skidding the same longitudinally from said cradle onto said vehicle from the rear toward the front to position the butt ends of said logs adjacent the front of said vehicle and with the top ends of said logs projecting from the rear of said vehicle, providing a final haul road vehicle having a bucking saw apparatus mounted thereon for longitudinal movement, moving said pre-haul vehicle to a position at one end of said road vehicle with the top ends of said logs overhanging a portion of said road vehicle, ejecting said logs as a unit longitudinally from said pre-haul vehicle onto said road vehicle with the butt ends of said logs disposed at said one end of said road vehicle and utilizing said saw apparatus to cut said logs into predetermined length on said road vehicle.

4. A method of harvesting and transporting timber, said method comprising the steps of providing a unitary direction tree felling, delimbing, topping and log moving apparatus, utilizing said apparatus to cut a tree adjacent the ground while simultaneously exerting a pushing force on said tree at a point spaced above the cutting point, said force being exerted in a direction to fell said tree in a desired location, utilizing said apparatus to remove the limbs on said felled tree and sever the top to provide a log, utilizing said apparatus to grasp said log and move the same to a location adjacent a supporting cradle and deposit said log on said cradle, directionally felling and delimbing additional trees and depositing the additional logs on said cradle to form a bunch of logs of the desired size with the butt ends substantially in alignment, providing a self-loading and unloading pre-haul vehicle, loading said bunch of logs as a unit by skidding the same longitudinally from said cradle onto said vehicle from the rear toward the front to position the butt ends of said logs adjacent the front of said vehicle and with the ends of said logs projecting from the rear of said vehicle, providing a final haul road vehicle having a bucking saw apparatus mounted thereon for longitudinal movement, moving said pre-haul vehicle to a position at one end of said road vehicle with the top ends of said logs overhanging a portion of said road vehicle, ejecting said logs as a unit longitudinally from said pre-haul vehicle onto said road vehicle with the butt ends of said logs disposed at said one end of said road vehicle and utilizing said saw apparatus to cut said logs into predetermined lengths on said road vehicle.

5. A method of harvesting and transporting timber, said method comprising the steps of providing a unitary directional tree felling, delimbing, topping and log moving apparatus, utilizing said apparatus to cut a tree adjacent the ground while simultaneously exerting a pushing force on said tree at a point spaced above the cutting point, said force being exerted in a direction to fell said tree in a desired location, utilizing said apparatus to remove the limbs on said felled tree and sever the top to provide a log, utilizing said apparatus to grasp said log and move the same to a location adjacent to supporting cradle and deposit said log on said cradle, directionally felling and delimbing additional trees and depositing the additional logs on said cradle to form a bunch of logs of the desired size with the butt ends substantially in alignment, providing a self-loading and unloading pre-haul vehicle, loading said bunch of logs as a unit by skidding the same longitudinally from said cradle onto said vehicle from the rear toward the front to position the butt ends of said logs adjacent the front of said vehicle and with the top ends of said logs projecting from the rear of said vehicle, providing a final haul road vehicle, moving said pre-haul vehicle to a position at one end of said road vehicle with the top ends of said logs overhanging a portion of said road vehicle, ejecting said logs as a unit longitudinally from said pre-haul vehicle onto said road vehicle with the butt ends of said logs disposed at said one end of said road vehicle and cutting said logs into predetermined lengths on said road vehicle.

6. A method of harvesting and transporting timber, said method comprising the steps of providing a unitary directional tree felling, delimbing, topping and log moving apparatus, utilizing said apparatus to cut a tree adjacent the ground while simultaneously exerting a pushing force on said tree at a point spaced above the cutting point, said force being exerted in a direction to fell said tree in a desired location, utilizing said apparatus to remove the limbs on said felled tree and sever the top to provide a log, utilizing said apparatus to grasp said log and move the same to a location adjacent a supporting cradle and deposit said log on said cradle, directionally felling and delimbing additional trees and depositing the additional logs on said cradle to form a bunch of logs of the desired size with the butt ends substantially in alignment, providing a self-loading and unloading pre-haul vehicle, loading said bunch of logs as in a unit by skidding the same longitudinally from said cradle onto said vehicle from the rear toward the front to position the butt ends of said logs adjacent the front of said vehicle and with the top ends of said logs projecting from the rear of said vehicle, providing a final haul road vehicle, moving said pre-haul vehicle to a position at one end of said road vehicle with the top ends of said logs overhanging a portion of said road vehicle and ejecting said logs as a unit longitudinlly from said pre-haul vehicle onto said road vehicle.

7. A method of harvesting and transporting timber, said method comprising the steps of directionally felling a tree, delimbing and topping said tree to provide a log, transporting and depositing said log on a cradle, directionally felling, delimbing and topping additional trees and depositing the additional logs on said cradle to provide a bunch of logs of the desired size, loading said bunch of logs as a unit by movement longitudinally onto a pre-haul vehicle, moving said pre-haul vehicle to a position in longitudinal alignment with a final haul road vehicle, ejecting said bunch of logs as a unit from said pre-haul vehicle by longitudinal movement of said logs and simultaneously depositing the same on said road vehicle and cutting said logs into predetermined lengths on said road vehicle.

8. A method of harvesting and transporting timber, said method comprising the steps of directionally felling a tree, delimbing and topping said tree to provide a log, transporting and depositing said log on a cradle, directionally felling, delimbing and topping additional trees and depositing the additional logs on said cradle to provide a bunch of logs of the desired size, loading said bunch of logs as a unit by movement longitudinally onto a pre-haul vehicle, moving said pre-haul vehicle to a position in longitudinal alignment with a final haul road vehicle, ejecting said bunch of logs as a unit from said pre-haul vehicle by longitudinal movement of said logs and simultaneously depositing the same on said road vehicle.

9. A unitary directional tree felling, delimbing, topping and log moving apparatus comprising a self-propelled vehicle, bracket pivotally mounted on the forward end of said vehicle for movement about a horizontal axis, power means to pivotally move said bracket, a boom pivotally mounted on said bracket for movement about a vertical axis and movement about a second horizontal axis at right angles to said first horizontal axis, power means to pivotally move said boom about said vertical axis and power means to pivotally move said boom about said second horizontal axis, a yoke on the end of said boom remote from said bracket, a plate pivotally mounted in said yoke for movement about a third horizontal axis parallel to said second horizontal axis, power means to pivotally move said plate, a shaft depending from said plate, an oscillating motor carried by said shaft for movement about the axis of said shaft, a frame mounted on said motor for movement therewith, a slide mounted on said frame for movement at right angles to the axis of said shaft, power means to move said slide, a chain saw mounted on said slide and means to drive said saw, a second bracket pivotally mounted on said vehicle in transversely spaced relation to said first bracket for movement about a fourth horizontal axis, power means to pivotally move said second bracket, a second boom pivotally mounted on said second bracket for movement about a second vertical axis and movement about a fifth horizontal axis at right angles to said fourth horizontal axis, power means to pivotally move said second boom about said second vertical axis and power means to pivotally move said second boom about said fifth horizontal axis, said second boom being extensible and retractable, power means to extend and retract said second boom, a second yoke on the end of said second boom remote from said second bracket, a block pivotally mounted in said yoke for movement about a sixth horizontal axis parallel to said fifth horizontal axis, power means to pivotally move said block, a second shaft depending from said block, a second oscillating motor carried by said second shaft for movement about the axis of said second shaft, a second frame mounted on said second motor for movement therewith, a third oscillating motor carried by said second frame, an elongated concave jaw carried by said third motor for movement about an axis at right angles to said second shaft, cutting edges on the axial end edges of said jaw, a fourth oscillating motor carried by said second frame in axial alignment with said third motor, a second elongated concave jaw carried by said fourth motor in opposition to said first jaw for movement about the same axis as said first jaw, cutting edges on the axial end edges of said second jaw, an outwardly directed cutting blade on one end of said second frame, a funnel member pivotally mounted on the end of said second frame opposite said blade for movement about an axis at right angles to the axis of said third and fourth motors, a power driven winch on said second frame, a cable on said winch extending through said funnel member, a log engaging dog attached to the end of said cable, said dog being movable into and out of said funnel member, a power source on said vehicle for said power means and motors and control means on said vehicle convenient to the operator for controlling the operation of said power means and motors.

10. A unitary directional tree felling, delimbing, topping and log moving apparatus comprising a self-propelled vehicle, a bracket pivotally mounted on the forward end of said vehicle for movement about a horizontal axis, power means to pivotally move said bracket, a boom pivotally mounted on said bracket for movement about a vertical axis and movement about a second horizontal axis at right angles to said first horizontal axis, power means to pivotally move said boom about said vertical axis and power means to pivotally move said boom about said second horizontal axis, a shaft depending from the end of said boom remote from said bracket and pivotally mounted for movement about a third horizontal axis parallel to said second horizontal axis, power means to pivotally move said shaft, an oscillating motor carried by said shaft for movement about the axis of said shaft, a frame mounted on said motor for movement therewith, a slide mounted on said frame for movement at right angles to the axis of said shaft, power means to move said slide, a chain saw mounted on said slide and means to drive said saw, a second bracket pivotally mounted on said vehicle in transversely spaced relation to said first bracket for movement about a fourth horizontal axis, power means to pivotally move said second bracket, a second boom pivotally mounted on said second bracket for movement about a second vertical axis and movement about a fifth horizontal axis at right angles to said fourth horizontal axis, power means to pivotally move said second boom about said second vertical axis and power means to pivotally move said second boom about said fifth horizontal axis, said second boom being extensible and retractable, power means to extend and retract said second boom, a second shaft depending from the end of said second boom remote from said second bracket and pivotally mounted for movement about a sixth horizontal axis parallel to said fifth horizontal axis, power means to pivotally move said second shaft, a second oscillating motor carried by said second shaft for movement about the axis of said second shaft, a second frame mounted on said second motor for movement therewith, a third oscillating motor carried by said second frame, an elongated concave jaw carried by said third motor for movement about an axis at right angles to said second shaft, cutting edges on the axial end edges of said jaw, a fourth oscillating motor carried by said second frame in axial alignment with said third motor, a second elongated concave jaw carried by said fourth motor in opposition to said first jaw for movement about the same axis as said first jaw, cutting edges on the axial end edges of said second jaw, an outwardly directed cutting blade on one end of said second frame, a funnel member pivotally mounted on the end of said second frame opposite said blade for movement about an axis at right angles to the axis of said third and fourth motors, a power driven winch on said second frame, a cable on said winch extending through said funnel member, a log engaging dog attached to the end of said cable, said dog being movable into and out of said funnel member, a power source on said vehicle for said power means and motors and control means on said vehicle convenient to the operator for controlling the operation of said power means and motors.

11. A unitary directional tree felling, topping and log moving apparatus comprising a self-propelled vehicle, a bracket pivotally mounted on the forward end of said vehicle for movement about a horizontal axis, power means to pivotally move said bracket, a boom pivotally mounted on said bracket for movement about a vertical axis and movement about a second horizontal axis at right angles to said first horizontal axis, power means to pivotally move said boom about said vertical axis and power means to pivotally move said boom about said second horizontal axis, a shaft depending from the end of said boom remote from said bracket and pivotally mounted for movement about a third horizontal axis parallel to said second horizontal axis, power means to pivotally move said shaft, an oscillating motor carried by said shaft for movement about the axis of said shaft, a frame mounted on said motor for movement therewith, a slide mounted on said frame for movement at right angles to the axis of said shaft, power means to move said slide, a chain saw mounted on said slide and means to drive said saw, a second bracket pivotally mounted on said vehicle in transversely spaced relation to said first bracket for movement about a fourth horizontal axis, power means to pivotally move said second bracket, a second boom pivotally mounted on said second bracket for movement about a second vertical axis and movement about a fifth horizontal axis at right angles to said fourth horizontal axis, power means to pivotally move said second boom about said second vertical axis and power means to pivotally move said second boom about said fifth horizontal axis, said second boom being extensible and retractable, power means to extend and retract said second boom, a second shaft depending from the end of said second boom remote from said second bracket and pivotally mounted for movement about a sixth horizontal axis parallel to said fifth horizontal axis, power means to pivotally move said second shaft, a second oscillating motor carried by said second shaft for movement about the axis of said second shaft, a second frame mounted on said second motor for movement therewith, a third oscillating motor carried by said second frame, an elongated concave jaw carried by said third motor for movement about an axis at right angles to said second shaft, cutting edges on the axial end edges of said jaw, a fourth oscillating motor carried by said second frame in axial alignment with said third motor, a second elongated concave jaw carried by said fourth motor in opposition to said first jaw for movement about the same axis as said first jaw, cutting edges on the axial end edges of said second jaw, an outwardly directed cutting blade on one end of said second frame, a power driven winch on said second frame, a cable on said winch, a log engaging dog attached to the end of said cable, a power source on said vehicle for said power means and motors and control means on said vehicle convenient to the operator for controlling the operation of said power means and motors.

12. A unitary directional tree felling, delimbing, topping and log moving apparatus comprising a self-propelled vehicle, a bracket pivotally mounted on the forward end of said vehicle for movement about a horizontal axis, power means to pivotally move said bracket, a boom pivotally mounted on said bracket for movement about a vertical axis and movement about a second horizontal axis at right angles to said first horizontal axis, power means to pivotally move said boom about said vertical axis and power means to pivotally move said boom about said second horizontal axis, a shaft depending from the end of said boom remote from said bracket and pivotally mounted for movement about a third horizontal axis parallel to said second horizontal axis, power means to pivotally move said shaft, an oscillating motor carried by said shaft for movement about the axis of said shaft, a frame mounted on said motor for movement therewith, a chain saw mounted on said frame and means to drive said saw, a second bracket pivotally mounted on said vehicle in transversely spaced relation to said first bracket for movement about a fourth horizontal axis, power means to pivotally move said second bracket, a second boom pivotally mounted on said second bracket for movement about a second vertical axis and movement about a fifth horizontal axis at right angles to said fourth horizontal axis, power means to pivotally move said second boom about said second vertical axis and power means to pivotally move said second boom about said fifth horizontal axis, said second boom being extensible and retractable, power means to extend and retract said second boom, a second shaft depending from the end of said second boom remote from said second bracket and pivotally mounted for movement about a sixth horizontal axis parallel to said fifth horizontal axis, power means to pivotally move said second shaft, a second oscillating motor carried by said second shaft for movement about the axis of said second shaft, a second frame mounted on said second motor for movement therewith, a third oscillating motor carried by said second frame, an elongated concave jaw carried by said third motor for movement about an axis at right angles to said second shaft, cutting edges on the axial end edges of said jaw, a fourth oscillating motor carried by said second frame in axial alignment with said third motor, a second elongated concave jaw carried by said fourth motor in opposition to said first jaw for movement about the same axis as said first jaw, cutting edges on the axial end edges of said second jaw, an outwardly directed cutting blade on one end of said second frame, a power driven winch on said second frame, a cable on said winch, a log engaging dog attached to the end of said cable, a power source on said vehicle for said power means and motors and control means on said vehicle convenient to the operator for controlling the operation of said power means and motors.

13. A unitary directional tree felling, delimbing, topping and log moving apparatus comprising a self-propelled vehicle, a bracket pivotally mounted on the forward end of said vehicle for movement about a horizontal axis, power means to pivotally move said bracket, a boom pivotally mounted on said bracket for movement about a vertical axis and movement about a second horizontal axis at right angles to said first horizontal axis, power means to pivotally move said boom about said vertical axis and power means to pivotally move said boom about said second horizontal axis, a shaft depending from the end of said boom remote from said shaft and pivotally mounted for movement about a third horizontal axis parallel to said second horizontal axis, power means to pivotally move said shaft, an oscillating motor carried by said shaft for movement about the axis of said shaft, a frame mounted on said motor for movement therewith, a chain saw mounted on said frame and means to drive said saw, a second bracket pivotally mounted on said vehicle in transversely spaced relation to said first bracket for movement about a fourth horizontal axis, power means to pivotally move said second bracket, a second boom pivotally mounted on said second bracket for movement about a second vertical axis and movement about a fifth horizontal axis at right angles to said fourth horizontal axis, power means to pivotally move said second boom about said second vertical axis and power means to pivotally move said second boom about said fifth horizontal axis, said second boom being extensible and retractable, power means to extend and retract said second boom, a second shaft depending from the end of said second boom remote from said second bracket and pivotally mounted for movement about a sixth horizontal axis parallel to said fifth horizontal axis, power means to pivotally move said second shaft, a second oscillating motor carried by said second shaft for movement about the axis of said second shaft, a second frame mounted on said second motor for movement therewith, a third oscillating motor carried by said second frame, an elongated concave jaw carried by said third motor for movement about an axis at right angles to said second shaft, cutting edges on the axial end edges of said jaw, a fourth oscillating motor carried by said second frame in axial alignment with said third motor, a second elongated concave jaw carried by said fourth motor in opposition to said first jaw for movement about the same axis as said first jaw, cutting edges on the axial end edges of said second jaw, a power driven winch on said second frame, a cable on said winch, a log engaging dog attached to the end of said cable, a power source on said vehicle for said power means and motors and control means on said vehicle convenient to the operator for controlling the operation of said power means and motors.

14. A unitary directional tree felling, delimbing, topping and log moving apparatus comprising a self-propelled vehicle, a bracket pivotally mounted on the forward end of said vehicle for movement about a horizontal axis, power means to pivotally move said bracket, a boom pivotally mounted on said bracket for movement about a vertical axis and movement about a second horizontal axis at right angles to said first horizontal axis, power means to pivotally move said boom about said vertical axis and power means to pivotally move said boom about said second horizontal axis, a shaft depending from the end of said boom remote from said bracket and pivotally mounted for movement about a third horizontal axis parallel to said second horizontal axis, power means to pivotally move said shaft, an oscillating motor carried by said shaft for movement about the axis of said shaft, a frame mounted on said motor for movement therewith, a means to sever a tree mounted on said frame, a second bracket pivotally mounted on said vehicle in transversely spaced relation to said first bracket for movement about a fourth horizontal axis, power means to pivotally move said second bracket, a second boom pivotally mounted on said second bracket for movement about a second vertical axis and movement about a fifth horizontal axis at right angles to said fourth horizontal axis, power means to pivotally move said second boom about said second vertical axis and power means to pivotally move said second boom about said fifth horizontal axis, said second boom being extensible and retractable, power means to extend and retract said second boom, a second shaft depending from the end of said second boom remote from said second bracket and pivotally mounted for movement about a sixth horizontal axis parallel to said fifth horizontal axis, power means to pivotally move said second shaft, a second oscillating motor carried by said second shaft for movement about the axis of said second shaft, a second frame mounted on said second motor for movement therewith, a third oscillating motor carried by said second frame, an elongated concave jaw carried by said third motor for movement about an axis at right angles to said second shaft, cutting edges on the axial end edges of said jaw, a fourth oscillating motor carried by said second frame in axial alignment with said third motor, a second elongated concave jaw carried by said fourth motor in opposition to said first jaw for movement about the same axis as said first jaw, cutting edges on the axial end edges of said second jaw, a power driven winch on said second frame, a cable on said winch, a log engaging dog attached to the end of said cable, a power source on said vehicle for said power means and motors and control means on said vehicle convenient to the operator for controlling the operation of said power means and motors.

15. A unitary directional tree felling, delimbing, topping and log moving apparatus comprising a self-propelled vehicle, a bracket pivotally mounted on the forward end of said vehicle for movement about a horizontal axis, power means to pivotally move said bracket, a boom pivotally mounted on said bracket for movement about a vertical axis and movement about a second horizontal axis at right angles to said first horizontal axis, power means to pivotally move said boom about said vertical axis and power means to pivotally move said boom about said second horizontal axis, an oscillating motor depending from the end of said boom remote from said bracket and pivotally mounted for movement about a third horizontal axis parallel to said second horizontal axis, power means to pivotally move said motor, said oscillating motor being movable about an axis at right angles to said third horizontal axis, a frame mounted on said motor for movement therewith, means to sever a tree mounted on said frame, a second bracket pivotally mounted on said vehicle in transversely spaced relation to said first bracket for movement about a fourth horizontal axis, power means to pivotally move said second bracket, a second boom pivotally mounted on said second bracket for movement about a second vertical axis and movement about a fifth horizontal axis at right angles to said fourth horizontal axis, power means to pivotally move said second boom about said second vertical axis and power means to pivotally move said second boom about said fifth horizontal axis, said second boom being extensible and retractable, power means to extend and retract said second boom, a shaft depending from the end of said second boom remote from said second bracket and pivotally mounted for movement about a sixth horizontal axis parallel to said fifth horizontal axis, power means to pivotally move said shaft, a second oscillating motor carried by said shaft for movement about the axis of said shaft, a second frame mounted on said second motor for movement therewith, a third oscillating motor carried by said second frame, an elongated concave jaw carried by said third motor for movement about axis at right angles to said shaft, cutting edges on the axial end edges of said jaw, a fourth oscillating motor carried by said second frame in axial alignment with said third motor, a second elongated concave jaw carried by said fourth motor in opposition to said first jaw for movement about the same axis as said first jaw, cutting edges on the axial end edges of said second jaw, a power driven winch on said second frame, a cable on said winch, a log engaging dog attached to the end of said cable, a power source on said vehicle for said power means and motors and control means on said vehicle convenient to the operator for controlling the operation of said power means and motors.

16. A unitary directional tree felling, delimbing, topping and log moving apparatus comprising a self-propelled vehicle, a bracket pivotally mounted on the forward end of said vehicle for movement about a horizontal axis, power means to pivotally move said bracket, a boom pivotally mounted on said bracket for movement about a vertical axis and movement about a second horizontal axis at right angles to said first horizontal axis, power means to pivotally move said boom about said vertical axis and power means to pivotally move said boom about said second horizontal axis, an oscillating motor depending from the end of said boom remote from said bracket and pivotally mounted for movement about a third horizontal axis parallel to said second horizontal axis, power means to pivotally move said motor, said oscillating motor being movable about an axis at right angles to said third horizontal axis, a frame mounted on said motor for movement therewith, means to sever a tree mounted on said frame, a second bracket pivotally mounted on said vehicle in transversely spaced relation to said first bracket for movement about a fourth horizontal axis, power means to pivotally move said second bracket, a second boom pivotally mounted on said second bracket for movement about a second vertical axis and movement about a fifth horizontal axis at right angles to said fourth horizontal axis, power means to pivotally move said second boom about said second vertical axis and power mean to pivotally move said second boom about said fifth horizontal axis, said second boom being extensible and retractable, power means to extend and retract said second boom, a second oscillating motor depending from the end of said second boom remote from said second bracket and mounted for movement about a sixth horizontal axis parallel to said fifth horizontal axis, power means to pivotally move said second motor, the axis of said second oscillating motor being movable about an axis at right angles to said sixth horizontal axis, a second frame mounted on said second motor for movement therewith, a third oscillating motor carried by said second frame, an elongated concave jaw carried by said third motor for movement about an axis at right angles to the axis of said second motor, cutting edges on the axial end edges of said jaw, a fourth oscillating motor carried by said second frame in axial alignment with said third motor, a second elongated concave jaw carried by said fourth motor in opposition to said first jaw for movement about the same axis as said first jaw, cutting edges on the axial end edges of said second jaw, a power driven winch on said second frame, a cable on said winch, a log engaging dog attached to the end of said cable, a power source on said vehicle for said power means and motors and control means on said vehicle convenient to the operator for controlling the operation of said power means and motor.

17. A unitary directional tree felling, delimbing, topping and log moving apparatus comprising a self-propelled vehicle, a boom pivotally mounted on said vehicle for movement about a horizontal and vertical axis and movement about a second horizontal axis at right angles to said first horizontal axis, power means to move said boom about said first horizontal axis, power means to pivotally move said boom about said vertical axis and power means to pivotally move said boom about said second horizontal axis, an oscillating motor depending from the end of said boom remote from said vehicle and pivotally mounted for movement about a third horizontal axis parallel to said second horizontal axis, power means to pivotally move said motor, said oscillating motor being movable about an axis at right angles to said third horizontal axis, a frame mounted on said motor for movement therewith, means to sever a tree mounted on said frame, a second boom pivotally mounted on said vehicle for movement about a fourth horizontal axis, movement about a second vertical axis and movement about a fifth horizontal axis at right angles to said fourth horizontal axis, power means to move said second boom about said fourth horizontal axis, power means to pivotally move said second boom about said second vertical axis and power means to pivotally move said second boom about said fifth horizontal axis, said second boom being extensible and retractable, power means to extend and retract said second boom, a second oscillating motor depending from the end of said second boom remote from said vehicle and pivotally mounted for movement about a sixth horizontal axis parallel to said fifth horizontal axis, power means to pivotally move said second motor, the axis of said second oscillating motor being movable about an axis at right angles to said sixth horizontal axis, a second frame mounted on said second motor for movement therewith, a third oscillating motor carried by said second frame, an elongated concave jaw carried by said third motor for movement about an axis at right angles to the axis of said second motor, cutting edges on the axial end edges of said jaw, a fourth oscillating motor carried by said second frame in axial alignment with said third motor, a second elongated concave jaw carried by said fourth motor in opposition to said first jaw for movement about the same axis as said first jaw, cutting edges on the axial end edges of said second jaw, a power driven winch on said second frame, a cable on said winch, a log engaging dog attached to the end of said cable, a power source on said vehicle for said power means and motors and control means on said vehicle convenient to the operator for controlling the operation of said power means and motors.

18. A unitary directional tree felling, delimbing, topping and log moving apparatus comprising a self-propelled vehicle, a boom pivotally mounted on said vehicle for movement about a horizontal and vertical axis and movement about a second horizontal axis at right angles to said first horizontal axis, power means to move said boom about said first horizontal axis, power means to move said boom about said vertical axis and power means to move said boom about said second horizontal axis, an oscillating motor depending from the end of said boom remote from said vehicle and pivotally mounted for movement about a third horizontal axis parallel to said second horizontal axis, power means to pivotally move said motor, said oscillating motor being movable about an axis at right angles to said third horizontal axis, a frame mounted on said motor for movement therewith, means to sever a tree mounted on said frame, a second boom pivotally mounted on said vehicle for movement about a fourth horizontal axis, movement about a second vertical axis and movement about a fifth horizontal axis at right angles to said fourth horizontal axis, power means to move said second boom about said fourth horizontal axis, power means to move said second boom about said second vertical axis and power means to move said second boom about said fifth horizontal axis, a second oscillating motor depending from the end of said second boom remote from said vehicle and pivotally mounted for movement about a sixth horizontal axis parallel to said fifth horizontal axis, power means to pivotally move said second motor, the axis of said second oscillating motor being movable about an axis at right angles to said sixth horizontal axis, a second frame mounted on said second motor for movement therewith, a third oscillating motor carried by said second frame, an elongated concave jaw carried by said third motor for movement about an axis at right angles to the axis of said second motor, cutting edges on the axial end edges of said jaw, a fourth oscillating motor carried by said second frame in axial alignment with said third motor, a second elongated concave jaw carried by said fourth motor in opposition to said first jaw for movement about the same axis as said first jaw, cutting edges on the axial end edges of said second jaw, a power driven winch on said second frame, a cable on said winch, a log engaging dog attached to the end of said cable, a power source on said vehicle for said power means and motors and control means on said vehicle convenient to the operator for controlling the operation of said power means and motors.

19. A unitary directional tree felling, delimbing, topping and log moving apparatus comprising a self-propelled vehicle, a boom pivotally mounted on said vehicle for movement about a horizontal and vertical axis and movement about a second horizontal axis at right angles to said first horizontal axis, power means to move said boom about said first horizontal axis, power means to pivotally move said boom about said vertical axis and power means to move said boom about said second horizontal axis, an oscillating motor depending from the end of said boom remote from said vehicle and pivotally mounted for movement about a third horizontal axis parallel to said second horizontal axis, power means to pivotally move said motor, said oscillating motor being movable about an axis at right angles to said third horizontal axis, a frame mounted on said motor for movement therewith, means to sever a tree mounted on said frame, a second boom pivotally mounted on said vehicle for movement about a fourth horizontal axis, movement about a second vertical axis and movement about a fifth horizontal axis at right angles to said fourth horizontal axis, power means to move said second boom about said fourth horizontal axis, power means to pivotally move said second boom about said second vertical axis and power means to move said second boom about said fifth horizontal axis, a second oscillating motor depending from the end of said second boom remote from said vehicle and pivotally mounted for movement about a sixth horizontal axis parallel to said fifth horizontal axis, power means to pivotally move said second motor, the axis of said second oscillating motor being movable about an axis at right angles to said sixth horizontal axis, a second frame mounted on said second motor for movement therewith, a third oscillating motor carried by said second frame, an elongated concave jaw carried by said third motor for movement about an axis at right angles to the axis of said second motor, cutting edges on the axial end edges of said jaw, a fourth oscillating motor carried by said second frame in axial alignment with said third motor, a second elongated concave jaw carried by said fourth motor in opposition to said first jaw for movement about the same axis as said first jaw, cutting edges on the axial end edges of said second jaw, a power source on said vehicle for said power means and motors and control means on said vehicle convenient to the operator for controlling the operation of said power means and motors.

20. A unitary directional tree felling, delimbing, topping and log moving apparatus comprising a self-propelled vehicle, a boom pivotally mounted on said vehicle for movement about a horizontal and vertical axis, power means to move said boom about said horizontal axis and power means to move said boom about said vertical axis, an oscillating motor depending from the end of said boom remote from said vehicle and pivotally mounted for movement about a second horizontal axis parallel to said first horizontal axis, power means to pivotally move said motor, said motor being movable about an axis at right angles to said second horizontal axis, a frame mounted on said motor for movement therewith, means to sever a tree mounted on said frame, a second boom pivotally mounted on said vehicle for movement about a third horizontal axis and movement about a second vertical axis, power means to move said second boom about said third horizontal axis and power means to move said second boom about said second vertical axis, a second oscillating motor depending from the end of said second boom remote from said vehicle and pivotally mounted for movement about a fourth horizontal axis parallel to said third horizontal axis, power means to pivotally move said second motor, the axis of said second motor being movable about an axis at right angles to said fourth horizontal axis, a second frame mounted on said second motor for movement therewith, a third oscillating motor carried by said second frame, an elongated jaw carried by said third motor for movement about an axis at right angles to the axis of said second motor, cutting edges on the axial end edges of said jaw, a fourth oscillating motor carried by said second frame in axial alignment with said third motor, a second elongated concave jaw carried by said fourth motor in opposition to said first jaw for movement about the same axis as said first jaw, cutting edges on the axial end edges of said second jaw, a power source on said vehicle for said power means and motors and control means on said vehicle convenient to the operator for controlling the operation of said power means and motors.

21. A unitary directional tree felling, delimbing, topping and log moving apparatus comprising a self-propelled vehicle, cutting means mounted on said vehicle for movement to an operative position for cutting a tree and movement to an inoperative position, a combination tree pusher, delimber, topper and gripper means mounted on said vehicle for pushing a tree in the desired direction of fall, for delimbing and topping a felled tree while resting on the ground and for gripping the resulting log to move the same upon movement of said vehicle, power means for positioning said cutting means, power means for operating said combination tree pusher, delimber, topper and gripper means, a power source for said power means on said vehicle and control means for said power means on said vehicle.

22. A method of harvesting and transporting timber comprising sequentially directionally felling a tree, delimbing such felled tree in a direction longitudinal of its axis while in its felled condition, topping such felled tree to provide a timber length, grasping such length and removing it to an accumulation point, repeatedly so felling, delimbing, topping, grasping and removing further lengths to such point to provide a desired group of lengths, removing such group as a unit from such accumulation point by endwise movement of the group, transporting such removed group to a further accumulation point and depositing such group by reverse endwise movement thereof.

23. The method as claimed in claim 22 wherein said first accumulated group is elevated as a unit and moved longitudinally of its axis, transported in such elevated condition to said final accumulation point and at such point deposited by reverse longitudinal movement of the group.

24. In apparatus for harvesting timber, a combination comprising a mobile frame movable to a position adjacent a tree to be felled, said frame carrying means operative to sever a tree above the ground and for cooperation therewith and also carried by said frame means, additional means for exerting a pushing force on the tree while it is being severed so as to insure the felling thereof in a predetermined desired direction, and said additional means including movable bladed jaw means operative to delimb a felled tree while it is on the ground in response to relative movement between such tree and mobile frame.

25. A method of harvesting timber, said method comprising the steps of providing a self-propelled, movable, unitary, directional tree felling, delimbing, topping and log moving apparatus, utilizing said apparatus to cut a tree adjacent the ground while simultaneously exerting a pushing force on said tree at a point spaced above the cutting point, said force being exerted in a direction to fell said tree in a desired location, moving said apparatus longitudinally of said felled tree to remove the limbs therefrom, actuating said apparatus after removal of the limbs to sever the top and provide a log, and utilizing said apparatus to grasp said log to move and deposit the same in a desired location.

References Cited

UNITED STATES PATENTS

| | | | |
|---|---|---|---|
| 2,355,931 | 8/1944 | Walker | 214—38 |
| 2,587,681 | 3/1952 | Baldwin | 214—41 |
| 2,882,941 | 4/1959 | Pope. | |
| 2,948,311 | 8/1960 | McCollum. | |
| 3,074,446 | 1/1963 | Earl. | |

WILLIAM W. DYER, Jr., *Primary Examiner.*

W. D. BRAY, *Assistant Examiner.*